A 3D image processing apparatus includes: L and R graphic decoders which decode coded stream data to generate left-eye and right-eye image data; an image output control unit which outputs the generated image data; and a control unit which, when a decoding error occurs in generating one of the image data, and a successful decode occurs in generating the other of the image data, (i) shifts, by a preset offset, a pixel position of the other of the image data, to generate pseudo image data as the one of the image data, and (ii) outputs the pseudo image data to an image output control unit, wherein the image output control unit outputs the other of the image data and the pseudo image data, when the decoding error occurs in generating the one of the image data and the successful decode occurs in generating the other of the image data.

(12) United States Patent
Kitajima et al.

(10) Patent No.: US 8,836,758 B2
(45) Date of Patent: Sep. 16, 2014

(54) THREE-DIMENSIONAL IMAGE PROCESSING APPARATUS AND METHOD OF CONTROLLING THE SAME

(75) Inventors: Nobutaka Kitajima, Osaka (JP); Akifumi Yamana, Hyogo (JP); Atsushi Nishiyama, Osaka (JP); Tsutomu Hashimoto, Osaka (JP); Makoto Hirai, Osaka (JP)

(73) Assignee: Panasonic Corporation, Osaka (JP)

( * ) Notice: Subject to any disclaimer, the term of this patent is extended or adjusted under 35 U.S.C. 154(b) by 497 days.

(21) Appl. No.: 13/218,957

(22) Filed: Aug. 26, 2011

(65) Prior Publication Data

US 2011/0310225 A1 Dec. 22, 2011

Related U.S. Application Data

(63) Continuation of application No. PCT/JP2010/004923, filed on Aug. 5, 2010.

(30) Foreign Application Priority Data

Sep. 28, 2009 (JP) ................................. 2009-223479

(51) Int. Cl.
*H04N 13/00* (2006.01)
*H04N 19/89* (2014.01)
*H04N 19/44* (2014.01)
*H04N 19/597* (2014.01)
*H04N 13/04* (2006.01)

(52) U.S. Cl.
CPC ........... *H04N 13/007* (2013.01); *H04N 13/004* (2013.01); *H04N 19/00939* (2013.01); *H04N 19/00533* (2013.01); *H04N 19/00769* (2013.01); *H04N 13/0454* (2013.01)
USPC .................... 348/43; 348/41; 348/42; 348/44; 348/45; 348/46; 356/241.1; 356/117; 600/101

(58) Field of Classification Search
CPC .............. H04N 13/004; H04N 13/007; H04N 13/0454; H04N 19/00769; H04N 19/0053; H04N 19/00939; H04N 13/0055; H04N 13/0239; H04N 13/0059; H04N 13/0048
USPC ............................................... 348/43, 41, 42
See application file for complete search history.

(56) References Cited

U.S. PATENT DOCUMENTS 5,508,582 A * 4/1996 Sugimoto et al. ............. 313/118
5,717,415 A 2/1998 Iue et al.
(Continued)

FOREIGN PATENT DOCUMENTS

CN 1126344 A 7/1996
CN 1226786 A 8/1999
(Continued)

OTHER PUBLICATIONS

JP2004328556MT, Machine translation can be generated from JPO Web sites, Nov. 2004.*

(Continued)

*Primary Examiner* — Andy Rao
*Assistant Examiner* — Shan Elahi
(74) *Attorney, Agent, or Firm* — McDermott Will & Emery LLP

(57) ABSTRACT

9 Claims, 20 Drawing Sheets

(56) References Cited

U.S. PATENT DOCUMENTS

| | | | |
|---|---|---|---|
| 6,043,838 A | 3/2000 | Chen | |
| 6,061,083 A * | 5/2000 | Aritake et al. | 348/51 |
| 7,250,990 B2 * | 7/2007 | Sung et al. | 349/15 |
| 7,679,616 B2 | 3/2010 | Nomura et al. | |
| 8,111,758 B2 * | 2/2012 | Yun et al. | 375/240.28 |
| 8,417,023 B2 * | 4/2013 | Mitsuhashi et al. | 382/154 |
| 8,508,582 B2 * | 8/2013 | Newton et al. | 348/43 |
| 8,558,871 B2 * | 10/2013 | Yamaji et al. | 348/42 |
| 2002/0190921 A1 * | 12/2002 | Hilton | 345/6 |
| 2003/0007680 A1 * | 1/2003 | Iijima et al. | 382/154 |
| 2003/0013523 A1 * | 1/2003 | Tashiro et al. | 463/32 |
| 2003/0095177 A1 * | 5/2003 | Yun et al. | 348/42 |
| 2003/0117489 A1 * | 6/2003 | Jones et al. | 348/51 |
| 2004/0064048 A1 * | 4/2004 | Li | 600/447 |
| 2004/0120396 A1 * | 6/2004 | Yun et al. | 375/240.01 |
| 2005/0089212 A1 * | 4/2005 | Mashitani et al. | 382/154 |
| 2005/0134762 A1 * | 6/2005 | Sung et al. | 349/96 |
| 2005/0244050 A1 | 11/2005 | Nomura et al. | |
| 2005/0248561 A1 * | 11/2005 | Ito et al. | 345/419 |
| 2005/0270360 A1 * | 12/2005 | Reisinger | 347/194 |
| 2006/0171028 A1 * | 8/2006 | Oikawa et al. | 359/463 |
| 2007/0003134 A1 | 1/2007 | Song et al. | |
| 2009/0195643 A1 * | 8/2009 | Neuman | 348/51 |
| 2010/0079584 A1 * | 4/2010 | Sung et al. | 348/52 |
| 2010/0082234 A1 * | 4/2010 | Ohta et al. | 701/201 |
| 2010/0086285 A1 | 4/2010 | Sasaki et al. | |
| 2010/0103249 A1 * | 4/2010 | Lipton et al. | 348/51 |
| 2010/0238274 A1 * | 9/2010 | Kim et al. | 348/51 |
| 2011/0032252 A1 * | 2/2011 | Ohta | 345/419 |
| 2011/0242278 A1 * | 10/2011 | Yang et al. | 348/43 |
| 2011/0285706 A1 * | 11/2011 | Daigi | 345/419 |
| 2011/0285962 A1 * | 11/2011 | Ellinger et al. | 353/7 |

FOREIGN PATENT DOCUMENTS

| | | | | |
|---|---|---|---|---|
| CN | 1893673 A | | 1/2007 | |
| JP | 07-322302 | | 12/1995 | |
| JP | 2003-260028 | | 9/2003 | |
| JP | 2003260028 A | * | 9/2003 | H04N 1/04 |
| JP | 2003-319419 | | 11/2003 | |
| JP | 2003319419 A | * | 11/2003 | H04N 13/04 |
| JP | 2004-328566 | | 11/2004 | |
| JP | 2004328566 A | * | 11/2004 | H04N 13/04 |
| JP | 2008-306602 | | 12/2008 | |
| JP | 2009-124768 | | 6/2009 | |
| WO | 2010/038409 | | 4/2010 | |

OTHER PUBLICATIONS

JP2003260028MT, Machine translation can be generated from JPO Web sites, Sep. 2003.*
JP2003319419MT, Machine translation can be generated from JPO Web sites, Nov. 2003.*
Chinese Office Action issued in Chinese Patent Application No. 201080009971.2 mailed on Jul. 26, 2013.

* cited by examiner

FIG. 9
(a) Left-eye image 58L
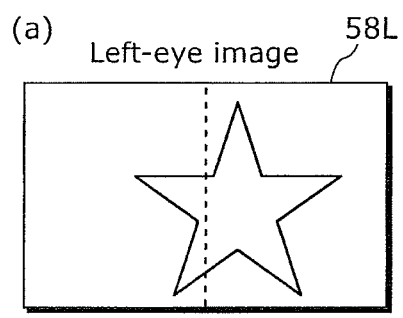
(b) Right-eye image 58R
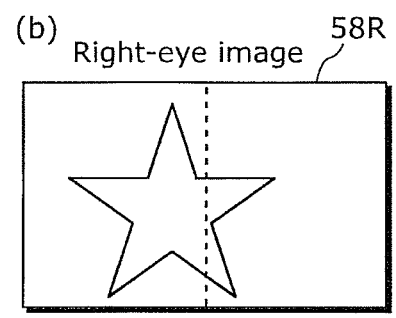
(c) Offset
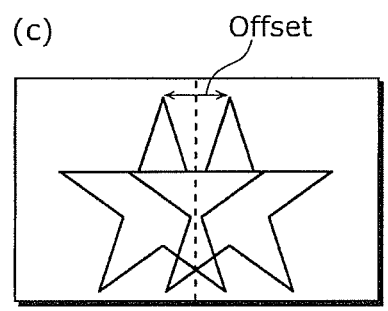

THREE-DIMENSIONAL IMAGE PROCESSING APPARATUS AND METHOD OF CONTROLLING THE SAME

CROSS REFERENCE TO RELATED APPLICATION

This is a continuation application of PCT application No. PCT/JP2010/004923 filed on Aug. 5, 2010, designating the United States of America.

BACKGROUND OF THE INVENTION (1) Field of the Invention

The present invention relates to three-dimensional (3D) image processing apparatuses and methods of controlling the same, and particularly to a 3D image processing apparatus and a method of controlling the same, which generate image data of images which bring no feeling of strangeness to users.

(2) Description of the Related Art

There have been known 3D image display apparatuses which display 3D images that are two-dimensional (2D) images which convey a stereoscopic perception to viewers (for example, see Patent Literature 1: Japanese Unexamined Patent Application Publication No. 2009-124768). Moreover, in recent years, home televisions having a function of displaying such 3D images have been increasingly implemented.

This 3D image display apparatus displays the images which convey a stereoscopic perception to viewers, by displaying a right-eye image and a left-eye image which have a parallax therebetween. For example, the 3D image display apparatus displays the right-eye image and the left-eye image alternately for each frame.

SUMMARY OF THE INVENTION

However, due to a decoding error or other factor, the left-eye image or the right-eye image may contain an error, or one of the images may be missing. In such a case, displaying the left-eye image and the right-eye image by a conventional device causes a problem of generating images which bring a feeling of strangeness to viewers. For example, normal left-eye images and noise-containing right-eye images are displayed alternately, or normal left-eye images and black images are displayed alternately.

The present invention has been devised in order to solve the above-described problem, and an object of the present invention is to provide a 3D image processing apparatus and a method of controlling the same, which can generate image data of images which bring no feeling of strangeness to viewers.

In order to achieve the above object, a 3D image processing apparatus according to an aspect of the present invention is a three-dimensional (3D) image processing apparatus which generates image data of multiple views for stereoscopic vision, the 3D image processing apparatus including: an image output control unit configured to output the image data of the multiple views generated as a result of decoding by a decoder; and a control unit configured to, when, in the decoder, a decoding error occurs in generating image data of a first view included in the multiple views and a successful decode occurs in generating image data of at least one other view which is different from the first view and included in the multiple views, (i) shift, by a preset offset, a pixel position of image data of a second view included in the other view, to generate pseudo image data of the first view, and (ii) output the generated pseudo image data of the first view to the image output control unit, wherein the image output control unit is configured to output the image data of the other view and the generated pseudo image data of the first view, when, in the decoder, the decoding error occurs in generating the image data of the first view and the successful decode occurs in generating the image data of the other view.

With this structure, even in the case where the image data of the first view cannot be obtained due to a decoding error, pseudo image data can be generated by shifting, by a predetermined offset, the image data of the second view included in the successfully decoded image data of the other views. Thus, it is possible to generate images which bring no feeling of strangeness to viewers.

Preferably, the above 3D image processing apparatus further includes a decoder which decodes stream data generated by coding image data of multiple views, to generate the image data of the multiple views.

Preferably, the image data of the multiple views includes left-eye image data and right-eye image data for stereoscopic vision, the decoder is configured to decode stream data generated by coding the left-eye image data and the right-eye image data, to generate the left-eye image data and the right-eye image data, the image output control unit is configured to output the left-eye image data and the right-image data generated by the decoder, the control unit is configured to, when, in the decoder, a decoding error occurs in generating one of the left-eye image data and the right-eye image data and a successful decode occurs in generating the other of the left-eye image data and the right-eye image data, (i) shift, by a preset offset, a pixel position of the other of the left-eye image data and the right-eye image data, to generate pseudo image data as the one of the left-eye image data and the right-eye image data, and (ii) output, to the image output control unit, the pseudo image data generated as the one of the left-eye image data and the right-eye image data, and the image output control unit is configured to output the other of the left-eye image data and the right-eye image data, and the pseudo image data generated as the one of the left-eye image data and the right-eye image data, when, in the decoder, the decoding error occurs in generating the one of the left-eye image data and the right-eye image data and the successful decode occurs in generating the other of the left-eye image data and the right-eye image data.

With this structure, even in the case where the left-eye image data or the right-eye image data cannot be obtained due to a decoding error, pseudo image data can be generated by shifting the successfully decoded image data by a predetermined offset. Thus, it is possible to generate images which bring no feeling of strangeness to viewers.

Preferably, the control unit is configured to (i) calculate, as the preset offset, a horizontal shift amount between the left-eye image data and the right-eye image data, for every successful decode of the decoder in generating the left-eye image data and the right-eye image data, and (ii) shift, by the latest preset offset, the pixel position of the other of the left-eye image data and the right-eye image data, to generate pseudo image data as the one of the left-eye image data and the right-eye image data, when, in the decoder, the decoding error occurs in generating the one of the left-eye image data and the right-eye image data and the successful decode occurs in generating the other of the left-eye image data and the right-eye image data.

With this structure, even in the case where the offset to be predetermined has not been predetermined or has not been included in the stream data, the offset can be calculated from the successfully decoded latest left-eye and right-eye image data. Thus, it is possible to generate images which bring no feeling of strangeness to viewers.

A 3D image processing apparatus according to another aspect of the present invention is a three-dimensional (3D) image processing apparatus which generates left-eye image data and right-eye image data for stereoscopic vision, the 3D image processing apparatus including: a decoder which decodes stream data generated by coding left-eye image data and right-eye image data, to generate the left-eye image data and the right-eye image data; and a control unit configured to, when, in the decoder, a successful decode occurs in generating both the left-eye image data and the right-eye image data, (i) output the left-eye image data and the right-eye image data at preset time intervals, and when, in the decoder, a decoding error occurs in generating one of the left-eye image data and the right-eye image data and a successful decode occurs in generating the other of the left-eye image data and the right-eye image data, (ii) output only the other of the left-eye image data and the right-eye image data at preset time intervals.

With this structure, even in the case where a decoding error occurs in generating one of the left-eye image data and the right-eye image data, the successfully decoded image data is continuously output, with the result that the presentation can be switched from 3D to 2D. Furthermore, in the 3D presentation and the 2D presentation, the image data is output at the same time intervals. Accordingly, even in the case where the presentation is switched, the display panel for displaying the image data is capable of displaying, at the same frame rate, the image data received from the 3D image processing apparatus, without special processes. Thus, no blackout occurs at the time of switching between the 3D presentation and the 2D presentation, which makes it possible to generate images which bring no feeling of strangeness to viewers.

Preferably, the control unit includes: an offset calculation unit configured to calculate, as an offset, a horizontal shift amount between the left-eye image data and the right-eye image data, for every successful decode of the decoder in generating each of the left-eye image data and the right-eye image data; and an offset update unit configured to update the offset by gradually decreasing the latest offset calculated by the offset calculation unit until the offset ultimately becomes 0, when, in the decoder, the decoding error occurs in generating the one of the left-eye image data and the right-eye image data and the successful decode occurs in generating the other of the left-eye image data and the right-eye image data, and the control unit is configured to, when, in the decoder, the decoding error occurs in generating the one of the left-eye image data and the right-eye image data and the successful decode occurs in generating the other of the left-eye image data and the right-eye image data, (i) shift, based on the offset updated by the offset update unit, a pixel position of the other of the left-eye image data and the right-eye image data, to generate pseudo image data as the one of the left-eye image data and the right-eye image data, (ii) output, at the preset time intervals, the other of the left-eye image data and the right-eye image data, and the pseudo image data generated as the one of the left-eye image data and the right-eye image data, until the offset is updated to 0, and (iii) output, at the preset time intervals, only the other of the left-eye image data and the right-eye image data after the offset is updated to 0.

With this structure, at the time of switching from the 3D presentation to the 2D presentation, the presentation is not instantaneously switched to the 2D presentation, but the offset is gradually changed to 0 so that the shift amount between the right-eye image data and the left-eye image data can be gradually eliminated. This allows smooth switching from the 3D presentation to the 2D presentation. Thus, it is possible to generate images which bring no feeling of strangeness to viewers.

More preferably, only when, in the decoder, decoding errors occur for a predetermined number of consecutive frames in generating one of the left-eye image data and the right-eye image data, the control unit is configured to output, at the preset time intervals, only the other of the left-eye image data and the right-eye image data which is generated as a result of the successful decode.

With this structure, the presentation can change from 3D to 2D only when decoding errors occur in the predetermined number of successive frames. This can prevent frequent switching of the presentation between 2D and 3D. Thus, it is possible to generate images which bring no feeling of strangeness to viewers.

More preferably, when the number of consecutive decoding errors by the decoder in generating one of the left-eye image data and the right-eye image data is less than the predetermined number of consecutive frames, the control unit is configured to output only the one of the left-eye image data and the right-eye image data which is generated as a result of a successful decode.

With this structure, in the case of the 3D presentation where a decoding error occurs in generating the image data to be displayed, the successfully decoded latest image data is output. As a result, no noise-containing images are displayed. Thus, it is possible to generate images which bring no feeling of strangeness to viewers.

A 3D image processing apparatus according to another aspect of the present invention is a three-dimensional (3D) image processing apparatus which generates left-eye image data and right-eye image data for stereoscopic vision, the 3D image processing apparatus including: a decoder which decodes stream data generated by coding left-eye image data and right-eye image data, to generate the left-eye image data and the right-eye image data; a 2D/3D display control unit configured to issue an instruction to switch to two-dimensional (2D) presentation or 3D presentation; and a control unit configured to, when the 2D/3D display control unit issues the instruction to switch to the 3D presentation, (i) output the left-eye image data and the right-eye image data at preset time intervals, and when the 2D/3D display control unit issues the instruction to switch to the 2D presentation, (ii) output, at the preset time intervals, only one of the left-eye image data and the right-eye image data.

With this structure, in the 3D presentation and the 2D presentation, the image data is output at the same time intervals Accordingly, even in the case where the presentation is switched, the display panel for displaying the image data is capable of displaying, at the same frame rate, the image data received from the 3D image processing apparatus, without special processes. Thus, no blackout occurs at the time of switching between the 3D presentation and the 2D presentation, which makes it possible to generate images which bring no feeling of strangeness to viewers.

It is to be noted that the present invention can be implemented not only as a 3D image processing apparatus which includes such characteristic processing units, but also as a method of controlling the 3D image processing apparatus, which method includes steps represented by the characteristic processing units included in the 3D image processing apparatus. Furthermore, the present invention can be implemented also as a program which causes a computer to execute the characteristic steps included in the method of controlling the 3D image processing apparatus. In addition, it goes without saying that such program may be distributed via a recording medium such as a Compact Disc-Read Only Memory (CD-ROM) and a communication network such as the Internet.

Furthermore, the present invention may be implemented as a semiconductor integrated circuit (LSI) which implements part or all of the functions of the 3D image processing apparatus, and implemented as a 3D image display apparatus such as a digital television which includes the 3D image processing apparatus, and implemented as a 3D image display system which includes the 3D image display apparatus.

The present invention can provide a 3D image processing apparatus capable of generating images which bring no feeling of strangeness to viewers, and also provide a method of controlling the same.

FURTHER INFORMATION ABOUT TECHNICAL BACKGROUND TO THIS APPLICATION

The disclosure of Japanese Patent Application No. 2009-223479 filed on Sep. 28, 2009 including specification, drawings and claims is incorporated herein by reference in its entirety.

The disclosure of PCT application No. PCT/JP2010/004923 filed on Aug. 5, 2010, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 9 explains an offset;

DESCRIPTION OF THE PREFERRED EMBODIMENT(S)

Embodiments of a 3D image processing apparatus according to the present invention are described in detail below with reference to the drawings.

First Embodiment

A 3D image processing apparatus according to the first embodiment of the present invention generates image data with which a stereoscopic presentation of a graphic is possible even when there is a failure to decode a left-eye graphic or a right-eye graphic among graphics such as a subtitle or a diagram which are to be displayed on a screen.

First, a structure of a 3D image display system including the 3D image processing apparatus according to the first embodiment of the present invention is described.

Figure 1:
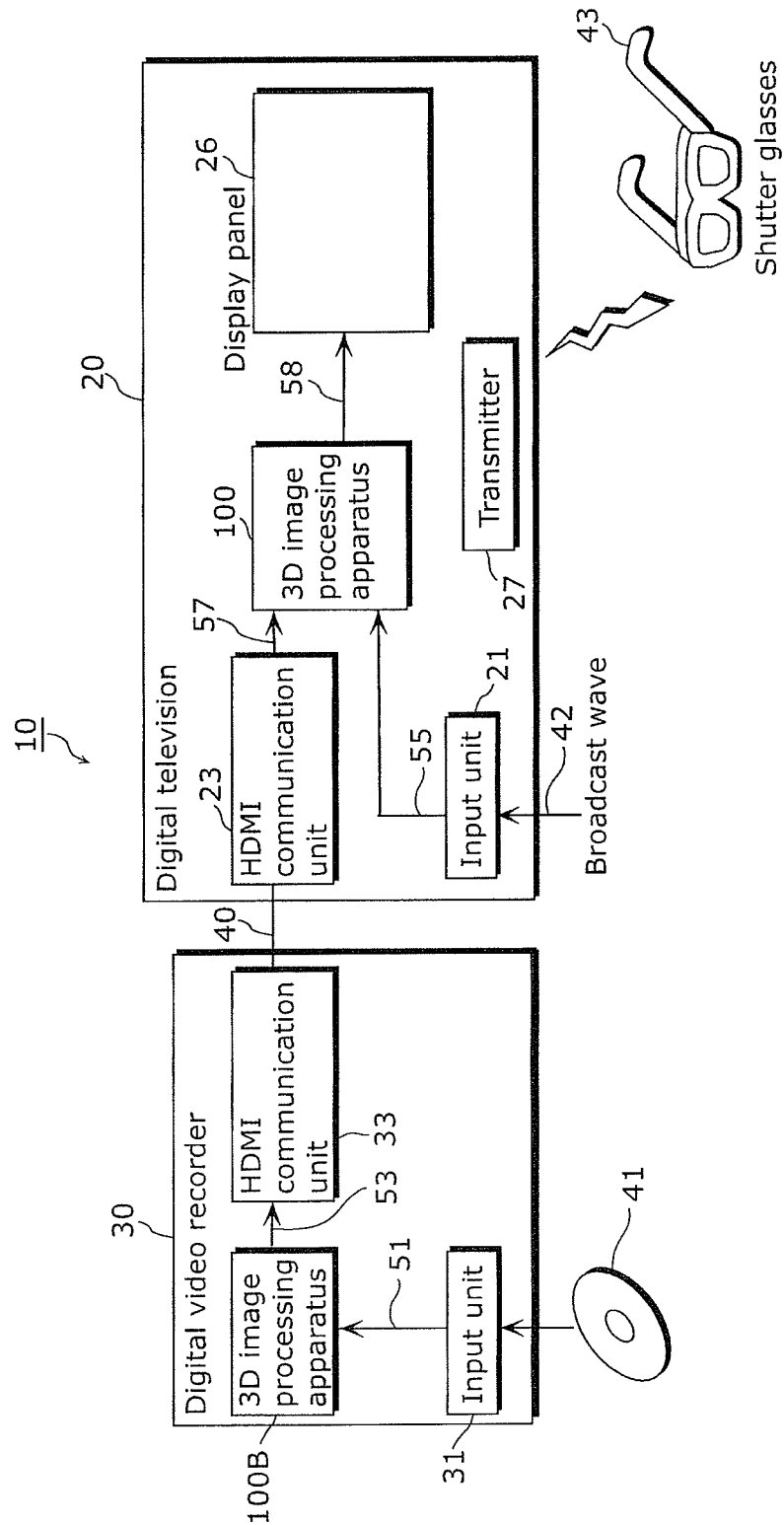
FIG. 1 is a block diagram showing a structure of a 3D image display system according to the first embodiment of the present invention.

FIG. 1 is a block diagram showing the structure of the 3D image display system according to the first embodiment of the present invention.

A 3D image display system 10 shown in FIG. 1 includes a digital television 20, a digital video recorder 30, and shutter glasses 43. The digital television 20 and the digital video recorder 30 are interconnected via a High-Definition Multimedia Interface (HDMI) cable 40.

The digital video recorder 30 coverts 3D image data recorded on an optical disc 41 such as a blu-ray disc (BD), into a format in which the data can be displayed in 3D, and outputs the resultant 3D image data to the digital television 20 via the HDMI cable 40.

The digital television 20 coverts 3D image data included in broadcast waves 42, into a format in which the data can be displayed in 3D, and displays the data. For example, the broadcast waves 42 include digital terrestrial television broadcasting or digital satellite broadcasting. The digital television 20 displays the 3D image data output from the digital video recorder 30.

The digital video recorder 30 may convert 3D image data recorded on a recording medium (e.g., a hard disk drive or a non-volatile memory) other than the optical disc 41, into a format in which the data can be displayed in 3D. Furthermore, the digital video recorder 30 may convert the 3D image data included in the broadcast waves 42 or 3D image data obtained through a communications network such as the Internet, into a format in which the data can be displayed in 3D. In addition, the digital video recorder 30 may also convert 3D image data input from an external device to an external input terminal (not shown) or the like, into a format in which the data can be displayed in 3D.

Likewise, the digital television 20 may convert the 3D image data recorded on the optical disc 41 and other recording media, into a format in which the data can be displayed in 3D. Furthermore, the digital television 20 may convert the 3D image data obtained through a communications network such as the Internet, into a format in which the data can be displayed in 3D. In addition, the digital television 20 may also convert the 3D image data input from an external device other than the digital video recorder 30 to an external input terminal (not shown) or the like, into a format in which the data can be displayed in 3D.

The digital television 20 and the digital video recorder 30 may also be interconnected via a standardized cable other than the HDMI cable 40 or via a wireless communications network.

The digital video recorder 30 includes an input unit 31, a 3D image processing apparatus 100B, and an HDMI communication unit 33.

The input unit 31 receives coded 3D image data 51 recorded on the optical disc 41.

The 3D image processing apparatus 100B generates output 3D image data 53 by converting the coded 3D image data 51 received by the input unit 31, into a format in which the data can be displayed in 3D.

The HDMI communication unit 33 outputs the output 3D image data 53 generated by the 3D image processing apparatus 100B, to the digital television 20 via the HDMI cable 40.

The digital video recorder 30 may store the generated output 3D image data 53 into a storage unit (such as a hard disk drive or a non-volatile memory) included in the digital video recorder 30, or may also store the generated output 3D image data 53 onto a recording medium (such as an optical disc) which can be inserted into and removed from the digital video recorder 30.

The digital television 20 includes an input unit 21, an HDMI communication unit 23, the 3D image processing apparatus 100, the display panel 26, and the transmitter 27.

The input unit 21 receives coded 3D image data 55 included in the broadcast waves 42.

The HDMI communication unit 23 receives the output 3D image data 53 provided by the HDMI communication unit 33, and outputs them as input 3D image data 57.

The 3D image processing apparatus 100 generates the output 3D image data 58 by converting the coded 3D image data 55 received by the input unit 21, into a format in which the data can be displayed in 3D, and outputs the output 3D image data 58. Furthermore, the 3D image processing apparatus 100 generates the output 3D image data 58 using the input 3D image data 57 provided by the HDMI communication unit 23, and outputs the output 3D image data 58.

The display panel 26 displays the output 3D image data 58 provided by the 3D image processing apparatus 100.

Figure 2A:
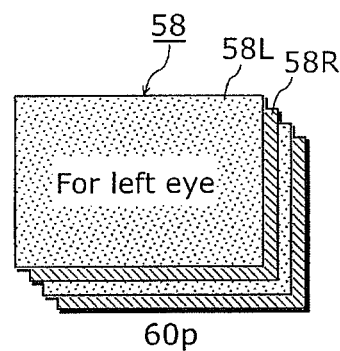
FIG. 2A shows an example of output 3D image data including image data of left-eye images and right-eye images.

As shown in FIG. 2A, the output 3D image data 58 includes image data of a left-eye image 58L and a right-eye image 58R. Hereinafter, the left-eye image 58L may indicate the image data of the left-eye image 58L as appropriate. The same applies to the right-eye image 58R. The 3D image processing apparatus 100 generates the output 3D image data 58 in which a frame including the left-eye image 58L only and a frame including the right-eye image 58R only are alternately disposed. The output 3D image data 58 is image data of 60p (in progressive format at a frame rate of 60 frames per second (fps)), for example.

The transmitter 27 controls the shutter glasses 43 using wireless communications.

The shutter glasses 43 are, for example, liquid crystal shutter glasses worn by a viewer, and include a left-eye liquid crystal shutter and a right-eye liquid crystal shutter. The transmitter 27 controls opening and closing of the left-eye liquid crystal shutter and the right-eye liquid crystal shutter with the same timing of displaying the left-eye image 58L and the right-eye image 58R. Specifically, the transmitter 27 opens the left-eye liquid crystal shutter of the shutter glasses 43 and closes the right-eye liquid crystal shutter thereof while the left-eye image 58L is displayed. Furthermore, the transmitter 27 closes the left-eye liquid crystal shutter of the shutter glasses 43 and opens the right-eye liquid crystal shutter thereof while the right-eye image 58R is displayed. By such controls on the display timing and the opening and closing timing of the shutters, the left-eye image 58L and the right-eye image 58R selectively and respectively enter the left eye and the right eye of the viewer.

It is to be noted that the method of selectively presenting the left-eye image 58L and the right-eye image 58R respectively to the left eye and the right eye of the viewer is not limited to the method described above, and a method other than the above may be used.

Figure 2B:
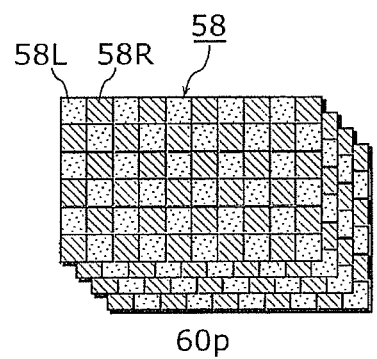
FIG. 2B shows another example of the output 3D image data including the image data of the left-eye images and the right-eye images.

For example, as shown in FIG. 2B, the left-eye images 58L and the right-eye images 58R may be arranged in a checkered pattern within each frame in the output 3D image data 58. In this case, the display panel 26 includes a left-eye polarizing film formed on a left-eye pixel and a right-eye polarizing film formed on a right-eye pixel so that the left-eye image 58L and the right-eye image 58R are subject to different polarizations (linear polarization, circular polarization, or the like). The shutter glasses 43 can be replaced by polarized glasses having a left-eye polarizing filter and a right-eye polarizing filter which correspond to the above respective polarizations, so that the left-eye image 58L and the right-eye image 58R enter the left eye and the right eye, respectively, of the viewer.

Figure 3:
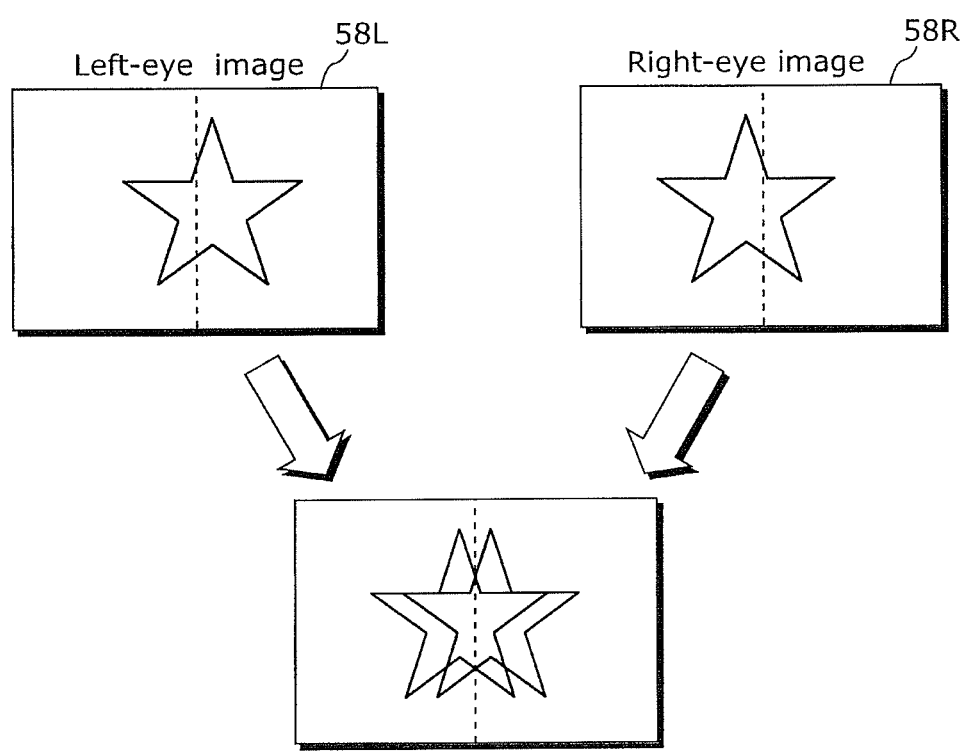
FIG. 3 shows an example of the left-eye image and the right-eye image according to the first embodiment of the present invention.

FIG. 3 shows an example of the left-eye image 58L and the right-eye image 58R.

As shown in FIG. 3, objects included in the left-eye image 58L and the right-eye image 58R have a parallax which depends on a distance from an image capturing position to the objects.

It is to be noted that, in the case where the 3D image processing apparatus 100B included in the digital video recorder 30 performs the above conversion into a format in which the data can be displayed in 3D, the 3D image processing apparatus 100B converts the pattern of arrangement of the coded 3D image data 51 into a predetermined arrangement pattern (e.g., a checkered pattern), as well as converts the coded 3D image data 51 into image data of 60p, as shown in FIG. 2B, for example. In this case, the 3D image processing apparatus 100 included in the digital television 20 performs only conversion of the pattern of arrangement of this input 3D image data 57 of 60p (for example, the conversion into an arrangement in which the left-eye images 58L and the right-eye images 58R are temporally alternately disposed).

It is also possible that the 3D image processing apparatus 100B converts the output 3D image data 58 into the format shown in FIG. 2A, and the 3D image processing apparatus 100 outputs the same image data as the output 3D image data 58. Furthermore, the 3D image processing apparatus 100 and the 3D image processing apparatus 100B may perform partially overlapping processes.

Next, a structure of the 3D image processing apparatus 100 is described. The 3D image processing apparatus 100B has a like structure as the 3D image processing apparatus 100.

Accordingly, only the 3D image processing apparatus 100 is described in detail while descriptions on the 3D image processing apparatus 100B will not be repeated.

Figure 4:
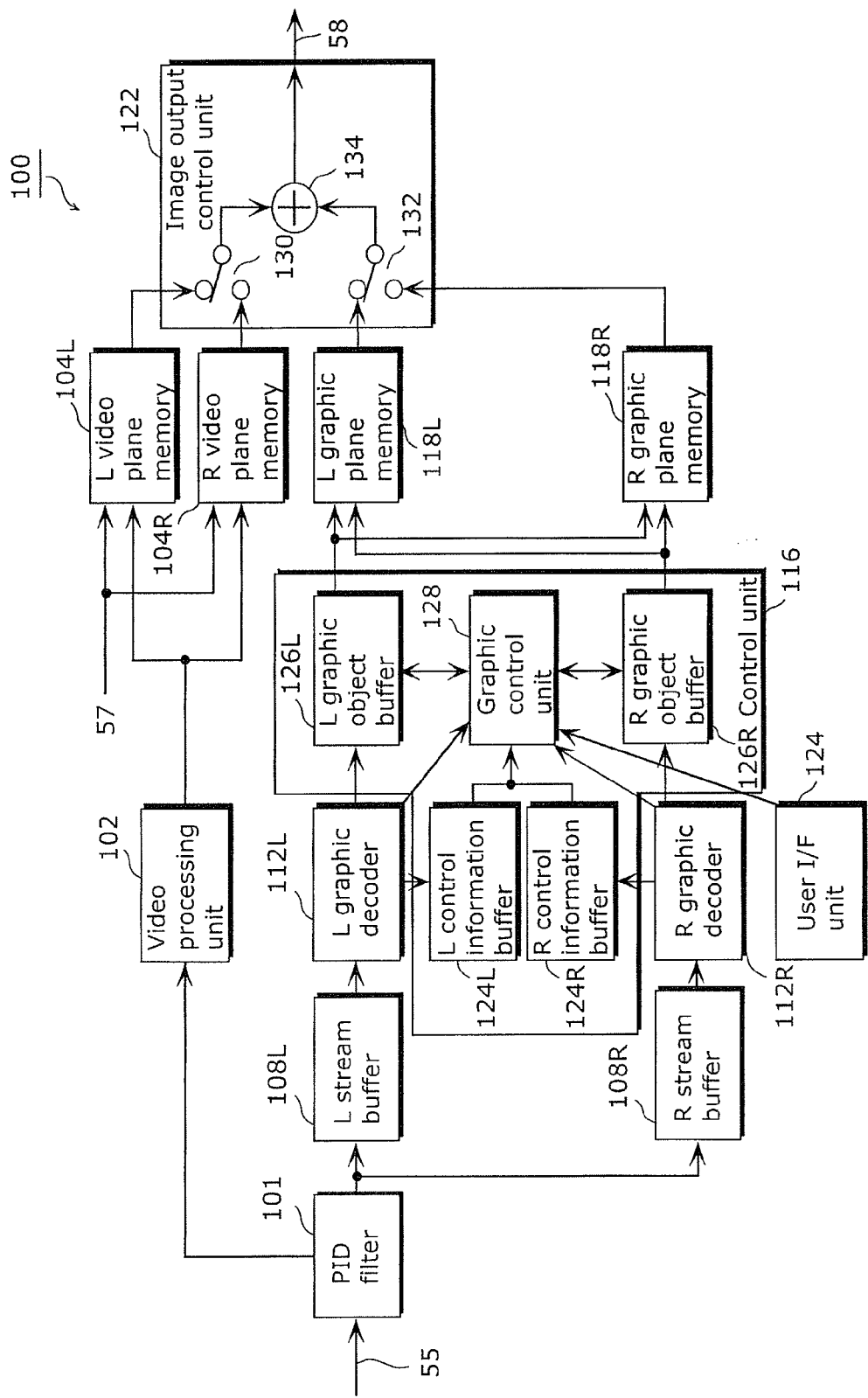
FIG. 4 is a block diagram showing a structure of a 3D image processing apparatus according to the first embodiment of the present invention.

FIG. 4 is a block diagram showing the structure of the 3D image processing apparatus 100.

As shown in FIG. 4, the 3D image processing apparatus 100 includes a PID filter 101, a video processing unit 102, an L video plane memory 104L, an R video plane memory 104R, an L stream buffer 108L, an R stream buffer 108R, an L graphic decoder 112L, an R graphic decoder 112R, a control unit 116, an L graphic plane memory 118L, an R graphic plane memory 118R, an image output control unit 122, and a user interface (I/F) unit 124.

The PID filter 101 determines a packet identifier (PID) included in the coded 3D image data 55, and performs filtering on packet data. Specifically, on the basis of the PID, the PID filter 101 divides the input coded 3D image data 55 into coded video data and coded graphic data. Furthermore, on the basis of the PID, the PID filter 101 divides the coded graphic data into left-eye coded graphic data and right-eye coded graphic data. Here, the video data indicates data of moving pictures captured by a camera and includes also artificially-created data such as computer graphics (CG) or animations. The graphic data indicates data which is displayed over the video data, and includes, for example, data of a subtitle in a film or of a menu image.

The video processing unit 102 generates the left-eye image 58L and the right-eye image 58R by decoding the coded video data resulting from the division by the PID filter 101.

The L video plane memory 104L is a memory in which the left-eye image 58L generated by the video processing unit 102 is stored. The R video plane memory 104R is a memory in which the right-eye image 58R generated by the video processing unit 102 is stored. The L video plane memory 104L and the R video plane memory 104R may respectively store the left-eye image 58L and the right-eye image 58R which are included in the input 3D image data 57, instead of the left-eye image 58L and the right-eye image 58R which are generated by the video processing unit 102.

The L stream buffer 108L is a memory in which the left-eye coded graphic data resulting from the division by the PID filter 101 is stored. The R stream buffer 108R is a memory in which the right-eye coded graphic data resulting from the division by the PID filter 101 is stored.

The L graphic decoder 112L decodes, for each frame, the left-eye coded graphic data stored in the L stream buffer 108L, to obtain left-eye graphic data and an offset that is a shift amount for shifting the left-eye graphic data rightward. Furthermore, the L graphic decoder 112L calculates a decoding error rate at the time of decoding, and determines that there is a decoding failure, when the calculated decoding error rate is higher than a preset threshold. A decoding failure occurs due to scratches on the optical disc 41, noise included in the broadcast waves 42, or other factor. The L graphic decoder 112L determines that the decode is successful, when the decoding error rate is equal to or lower then the preset threshold.

Likewise, the R graphic decoder 112R decodes, for each frame, the right-eye coded graphic data stored in the R stream buffer 108R, to obtain right-eye graphic data and an offset that is a shift amount for shifting the right-eye graphic data leftward. Furthermore, the R graphic decoder 112R calculates a decoding error rate at the time of decoding, and determines that there is a decoding failure, when the calculated decoding error rate is higher than a preset threshold. The R graphic decoder 112R determines that the decode is successful, when the decoding error rate is equal to or lower then the preset threshold.

When decodes occur normally in the L graphic decoder 112L and the R graphic decoder 112R, the control unit 116 generates, based on the decoding result, the left-eye graphic data and the right-eye graphic data which have a parallax, and then writes the left-eye graphic data and the right-eye graphic data into the L graphic plane memory 118L and the R graphic plane memory 118R, respectively. This means that the control unit 116 shifts the left-eye graphic data resulting from the decoding by the L graphic decoder 112L, rightward based on the offset obtained by the decoding, and then writes the left-eye graphic data into the L graphic plane memory 118L. Likewise, the control unit 116 shifts the right-eye graphic data resulting from the decoding by the R graphic decoder 112R, leftward based on the offset obtained by the decoding, and then writes the left-eye graphic data into the R graphic plane memory 118R.

When a decode occurs normally in one of the L graphic decoder 112L and the R graphic decoder 112R while a decoding failure occurs in the other, the control unit 116 generate pseudo graphic data as the graphic data which is not obtained due to the decoding failure, using the graphic data resulting from the normal decoding. The control unit 116 writes the graphic data resulting from the normal decoding and the pseudo graphic data into the L graphic plane memory 118L and the R graphic plane memory 118R. A detailed structure of the control unit 116 will be described later.

The image output control unit 122 generates the output 3D image data 58 in which the left-eye image data and the right-eye image data are disposed alternately at 60p, and outputs the output 3D image data 58 to the display panel 26. The image output control unit 122 generates the left-eye image data by superimposing the left-eye graphic data stored in the L graphic plane memory 118L, on the left-eye image 58L stored in the L video plane memory 104L. The image output control unit 122 generates the right-eye image data by superimposing the right-eye graphic data stored in the R graphic plane memory 118R, on the right-eye image 58R stored in the R video plane memory 104R. A detailed structure of the image output control unit 122 will be described later.

Figure 5:
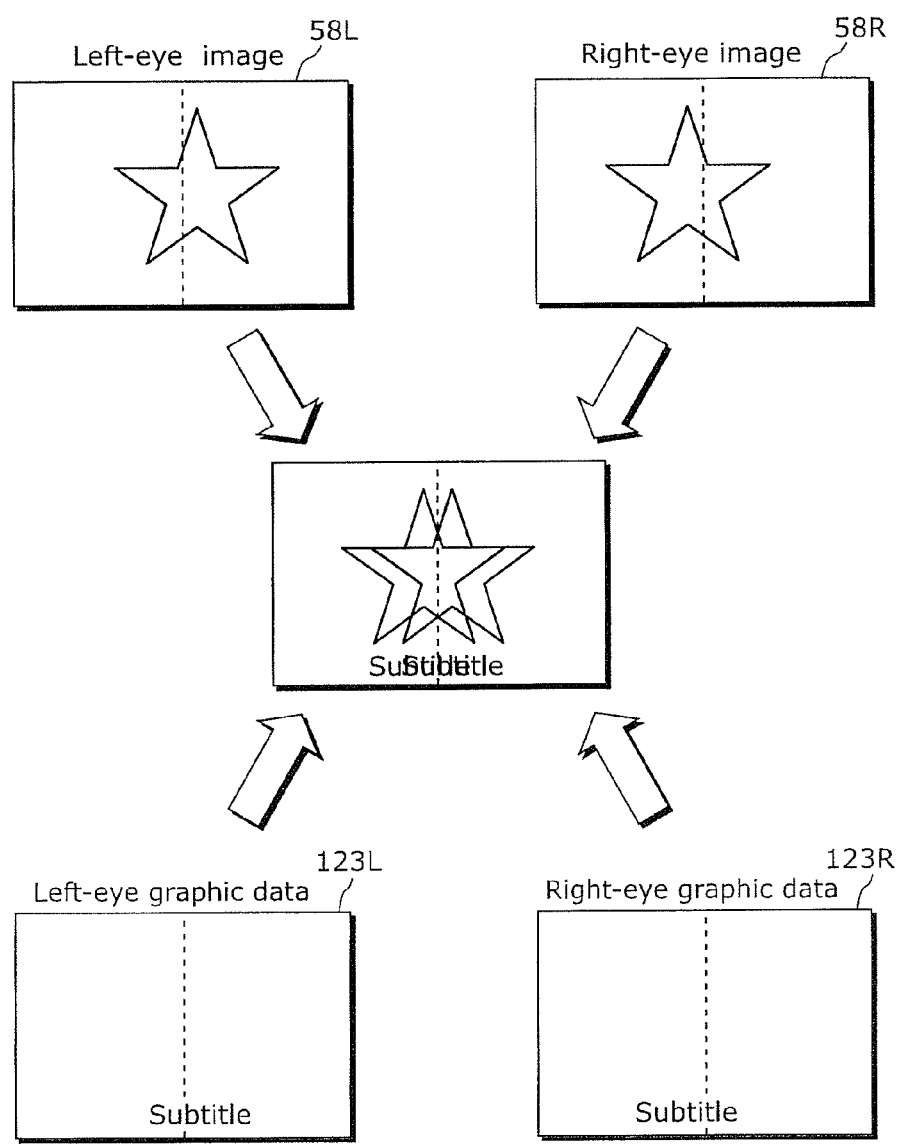
FIG. 5 shows an example of left-eye graphic data and right-eye graphic data which are generated by a control unit.

FIG. 5 shows an example of the left-eye graphic data and the right-eye graphic data which are generated by the control unit 116. As shown in FIG. 5, objects included in the left-eye graphic data 123L and the right-eye graphic data 123R have a parallax which depends on a distance from a pseudo image capturing position to the objects. The image output control unit 122 generates the left-eye image data by combining the left-eye image 58L and the left-eye graphic data 123L, and generates the right-eye image data by combining the right-eye image 58R and the right-eye graphic data 123R.

With reference to FIG. 4, the user I/F unit 124 specifies, for the control unit 116, a method of generating the pseudo graphic data. A detailed process which the user I/F unit 124 executes will be described later.

Next, a detailed structure of the control unit 116 is described.

As shown in FIG. 4, the control unit 116 includes an L control information buffer 124L, an R control information buffer 124R, an L graphic object buffer 126L, an R graphic object buffer 126R, and a graphic control unit 128.

The L graphic object buffer 126L is a memory in which the left-eye graphic data resulting from the decoding by the L graphic decoder 112 is stored. The R graphic object buffer 126R is a memory in which the right-eye graphic data resulting from the decoding by the R graphic decoder 112R is stored.

The L control information buffer 124L is a memory in which the offset of the left-eye graphic data resulting from the decoding by the L graphic decoder 112L is stored. The R control information buffer 124R is a memory in which the offset of the right-eye graphic data resulting from the decoding by the R graphic decoder 112R is stored.

Figure 6:
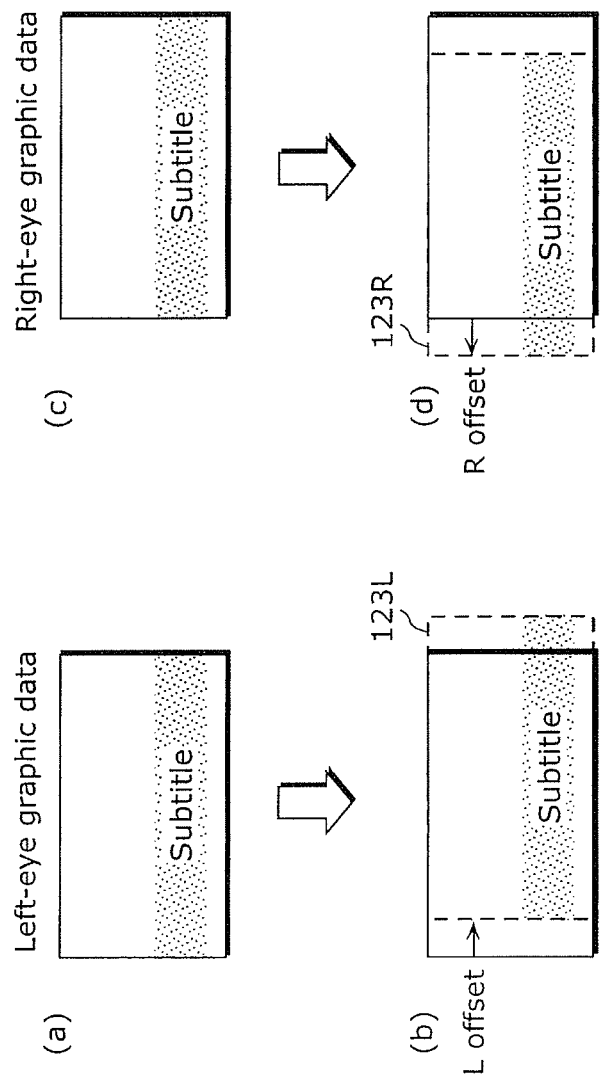
FIG. 6 explains a successful decoding process.

The graphic control unit 128 executes the following process when successful decodes occur in both the L graphic decoder 112L and the R graphic decoder 112R. FIG. 6 explains a successful decoding process. The graphic control unit 128 generates the left-eye graphic data 123L by shifting such left-eye graphic data as shown in (a) in FIG. 6, which is stored in the L graphic object buffer 126L, rightward by the offset stored in the L control information buffer 124L (which offset is hereinafter referred to as "L offset") as shown in (b) in FIG. 6. Likewise, the graphic control unit 128 generates the right-eye graphic data 123R by shifting such right-eye graphic data as shown in (c) in FIG. 6, which is stored in the R graphic object buffer 126R, leftward by the offset stored in the R control information buffer 124R (which offset is hereinafter referred to as "R offset") as shown in (d) in FIG. 6. The graphic control unit 128 writes the generated left-eye graphic data 123L into the L graphic plane memory 118L, and writes the generated right-eye graphic data 123R into the R graphic plane memory 118R.

The graphic control unit 128 may generate the left-eye graphic data 123L by shifting the left-eye graphic data leftward by the L offset, and generate the right-eye graphic data 123R by shifting the right-eye graphic data rightward by the R offset. Such shifting allows a graphic to be displayed in 3D; to look as if it is far from viewers.

Figure 7:
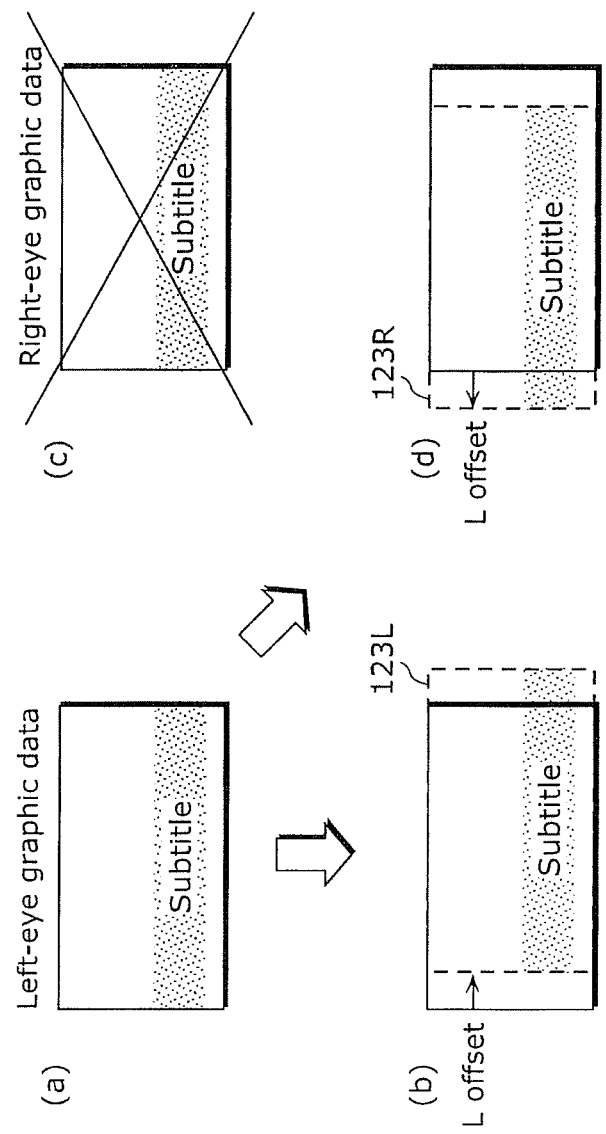
FIG. 7 explains a failed decoding process in an R graphic decoder.

The graphic control unit 128 executes the following process when a successful decode occurs in one of the L graphic decoder 112L and the R graphic decoder 112R while a decoding failure occurs in the other. While the following describes the case where a successful decode occurs in the L graphic decoder 112L and a decoding failure occurs in the R graphic decoder 112R, the same applies to the opposite case. FIG. 7 explains a failed decoding process in the R graphic decoder 112R. When the graphic control unit 128 is notified by the L graphic decoder 112L that the decode is successful, and is notified by the R graphic decoder 112R that there is a decoding failure, then the graphic control unit 128 generates the left-eye graphic data 123L by shifting such left-eye graphic data as shown in (a) in FIG. 7, which is stored in the L graphic object buffer 126L, rightward by the L offset as shown in (b) in FIG. 7. Furthermore, the graphic control unit 128 generates pseudo right-eye graphic data 123R by shifting such left-eye graphic data as shown in (a) in FIG. 7, which is stored in the L graphic object buffer 126L, leftward by the L offset as shown in (d) in FIG. 7. That is, since the right-eye graphic data and the R offset are not present due to the decoding failure, the graphic control unit 128 generates the pseudo right-eye graphic data 123R using the left-eye graphic data and the L offset. The graphic control unit 128 writes the generated left-eye graphic data 123L into the L graphic plane memory 118L, and writes the generated right-eye graphic data 123R into the R graphic plane memory 118R.

In a manner as described above, the L graphic plane memory 118L and the R graphic plane memory 118R are created. In the case where no offset is included in the coded graphic data and thus no offset can be obtained through the decoding, a horizontal shift amount between the left-eye graphic data and the right-eye graphic data is determined as an offset based on the left-eye graphic data and the right-eye graphic data. Specifically, the graphic control unit 128 calculates, as an offset, the horizontal shift amount between the left-eye graphic data 123L and the right-eye graphic data 123R ((b) and (d) in FIG. 7) in a frame successfully decoded by both the L graphic decoder 112L and the R graphic decoder 112R. The shift amount is calculated by pattern matching between the left-eye graphic data 123L and the right-eye graphic data 123R. For example, a block of a predetermined size (e.g., a block of 8×8 pixels) extracted from the right-eye graphic data 123R is scanned on the left-eye graphic data 123L, to obtain the position of a corresponding block, and the distance between the blocks is determined as the shift amount (offset). The graphic control unit 128L updates, for each frame, the offset determined by the pattern matching. When a decoding failure occurs in the R graphic decoder 112R, the graphic control unit 128 generates the pseudo right-eye graphic data 123R using the latest offset. For each frame, one offset is determined. Furthermore, a value of the calculated offset is a sum total of the L offset and the R offset. Thus, the graphic control unit 128 generates the pseudo right-eye graphic data 123R using half the value of the calculated offset as the L offset.

In generating the right-eye graphic data 123R, whether to use the offset included in the coded graphic data or to use the offset determined by the pattern matching is determined according to a user input from the user I/F unit 124.

It is to be noted that the graphic control unit 128 performs the same or like process, not only when a decoding failure occurs in the L graphic decoder 112L or the R graphic decoder 112R, but also when an underflow occurs in the L stream buffer 108L or the R stream buffer 108R at the beginning or end of input of the coded 3D image data 55.

Next, details of the image output control unit 122 are described.

As shown in FIG. 4, the image output control unit 122 includes a switch 130, a switch 132, and an adder 134.

The switch 130 alternately selects and outputs the left-eye image 58L stored in the L video plane memory 104L and the right-eye image 58R stored in the R video plane memory 104R. The switching speed of the switch 130 is 60p. This means that the left-eye image 58L and the right-eye image 58R are alternately output, and 30 left-eye images 58L and 30 right-eye images 58R are output per second.

The switch 132 alternately selects and outputs the left-eye graphic data 123L stored in the L graphic plane memory 118L and the right-eye graphic data 123R stored in the R graphic plane memory 118R. The switching speed of the switch 132 is 60p. This means that the left-eye graphic data 123L and the right-eye graphic data 123R are alternately output, and 30 left-eye graphic data 123L and 30 right-eye graphic data 123R are output per second.

The switch 130 and the switch 132 perform switching of input in synchronization with each other. Specifically, when the switch 130 selects the L video plane memory 104L, the switch 132 selects the L graphic plane memory 118L. When the switch 130 selects the R video plane memory 104R, the switch 132 selects the R graphic plane memory 118R.

It is to be noted that the switching speed of each of the switch 130 and the switch 132 is an example and therefore not limited to 60p, and if the display panel 26 is capable of handling the processing speed of 120p, then the switching speed may be 120p.

The adder 134 superimposes the graphic data provided by the switch 132, on the image provided by the switch 130, and outputs, as the output 3D image data 58, the resultant data to the display panel 26. That is, the adder 134 generates the left-eye image data by superimposing the left-eye graphic data on the left-eye image 58L. Furthermore, the adder 134 generates the right-eye image data by superimposing the right-eye graphic data on the right-eye image 58R. The adder 134 outputs, to the display panel 26, the output 3D image data 58 in which the generated right-eye image data and the left-eye image data are disposed alternately at 60p.

As described above, even in the case where the left-eye graphic data or the right-eye graphic data cannot be obtained due to a decoding failure or other factor, the 3D image processing apparatus according to the present embodiment is capable of generating the pseudo graphic data by shifting the successfully decoded graphic data based on the offset. It is thus possible to generate image data of images which bring no feeling of strangeness to viewers.

Second Embodiment

In the above first embodiment, when the left-eye graphic data or the right-eye graphic data is not obtained due to a decoding failure, the successfully decoded graphic data is used to generate the pseudo graphic data as the graphic data which is not obtained due to the decoding failure. In the second embodiment, an apparatus is described which generates a pseudo image as an image which is not obtained due to a decoding failure, using a successfully decoded image (video data), when the left-eye image or the right-eye image is not obtained due to the decoding failure.

The following will not repeat the descriptions overlapping with those in the first embodiment and mainly describes the differences between the first embodiment and the present embodiment.

Figure 8:
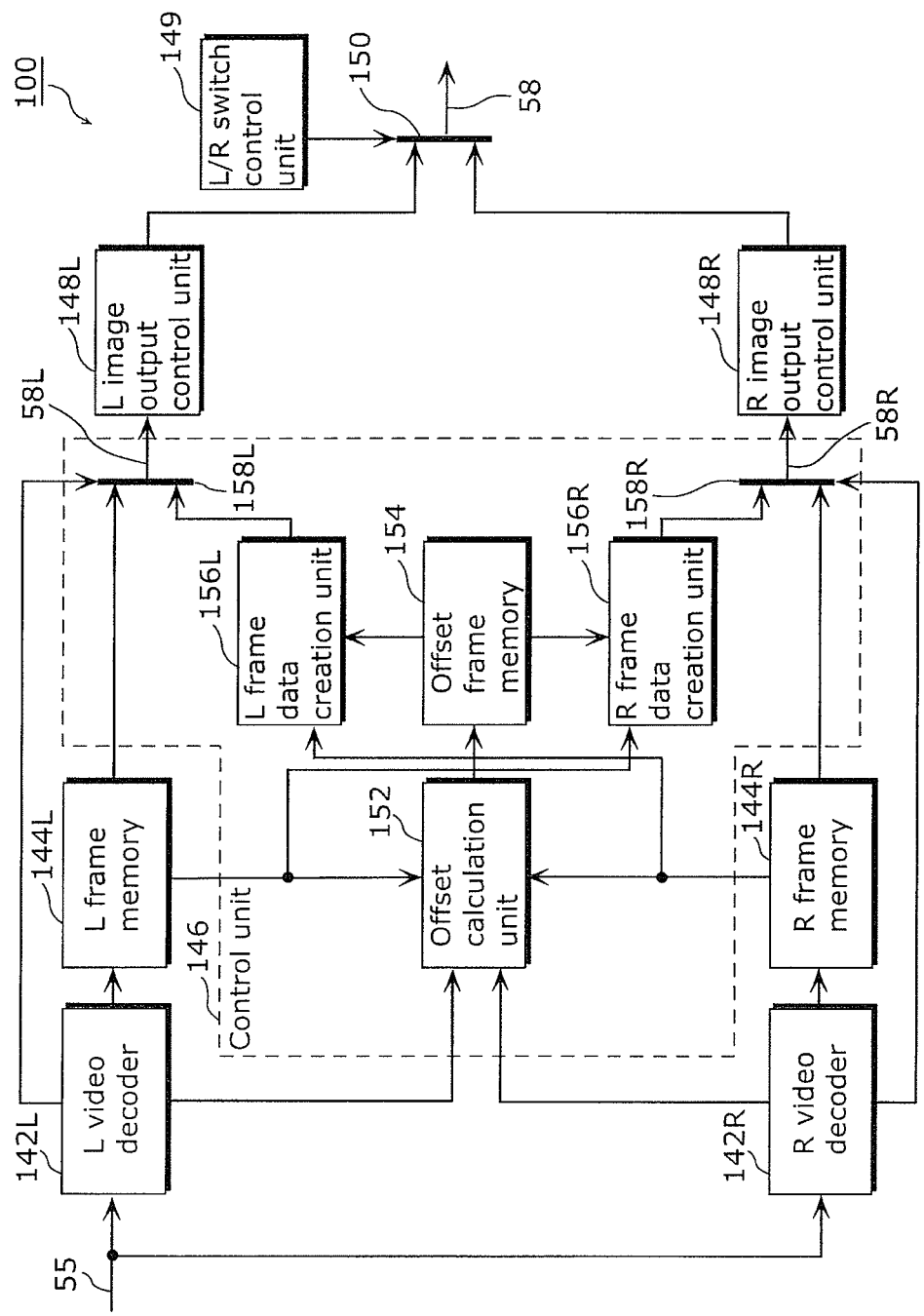
FIG. 8 is a block diagram showing a structure of a 3D image processing apparatus according to the second embodiment of the present invention.

FIG. 8 is a block diagram showing a structure of the 3D image processing apparatus 100 according to the second embodiment. This 3D image processing apparatus 100 is designed not to combine the video data and the graphic data, but only to decode the video data. Furthermore, the 3D image processing apparatus 100B has a like structure as the 3D image processing apparatus 100. Detailed descriptions on the 3D image processing apparatus 100B will therefore not be repeated.

The 3D image processing apparatus 100 includes an L video decoder 142L, an R video decoder 142R, an L frame memory 144L, an R frame memory 144R, a control unit 146, an L image output control unit 148L, an R image output control unit 148R, an L/R switch control unit 149, and a selector 150.

The L video decoder 142L receives the coded 3D image data 55 as an input, and decodes the coded 3D image data 55 to generate the left-eye image 58L. Likewise, the R video decoder 142R receives the coded 3D image data 55 as an input, and decodes the coded 3D image data 55 to generate the right-eye image 58R. Each of the L video decoder 142L and the R video decoder 142R calculates a decoding error rate at the time of decoding, and determines that there is a decoding failure, when the calculated decoding error rate is higher than a preset threshold. A decoding failure occurs due to scratches on the optical disc 41, noise included in the broadcast waves 42, or other factor. Each of the L video decoder 142L and the R video decoder 142R determines that the decode is successful, when the decoding error rate is equal to or lower then the preset threshold.

The L frame memory 144L is a memory in which the left-eye image 58L resulting from the decoding by the L video decoder 142L is stored. Likewise, the R frame memory 144R is a memory in which the right-eye image 58R resulting from the decoding by the R video decoder 142R is stored.

For a frame successfully decoded by both the L video decoder 142 and the R video decoder 142R, the control unit 146 outputs, to the L image output control unit 148L, the left-eye image 58L stored in the L frame memory 144L, and outputs, to the R image output control unit 148R, the right-eye image 58R stored in the R frame memory 144R. When a decoding failure occurs in one of the L video decoder 142L and the R video decoder 142R, the control unit 146 generates a pseudo image as the image which is not obtained due to the decoding failure, using the image resulting from the normal decoding. The control unit 146 outputs the normally decoded image and the generated pseudo image to the L image output control unit 148L and the R image output control unit 148R. A detailed structure of the control unit 116 will be described later.

The L image output control unit 148L outputs, at 60p, the left-eye image 58L provided by the control unit 146. Likewise, the R image output control unit 148R outputs, at 60p, the right-eye image 58R provided by the control unit 146.

The selector 150 is connected to the L image output control unit 148L and the R image output control unit 148R, and selects one of the left-eye image 58L and the right-eye image 58R according to a control signal from the L/R switch control unit 149, and then outputs the selected image. The L/R switch control unit 149 generates the control signal such that the selector 150 outputs the left-eye images 58L and the right-eye images 58R alternately at 60p, and then outputs the generated control signal to the selector 150. Through the processing of the L/R switch control unit 149 and the selector 150, the selector 150 generates the output 3D image data 58 in which the left-eye images 58L and the right-eye images 58R are alternately disposed. The output 3D image data 58 is an image data of 60p.

Next, a structure of the control unit 146 is described in detail.

As shown in FIG. 8, the control unit 146 includes an offset calculation unit 152, an offset frame memory 154, an L frame data creation unit 156L, an R frame data creation unit 156R, a selector 158L, and a selector 158R.

The offset calculation unit 152 calculates, as an offset, a horizontal shift amount between the left-eye image 58L and the right-eye image 58R in a frame successfully decoded by both the L video decoder 142L and the R video decoder 142R. For example, when such a left-eye image 58L as shown in (a) in FIG. 9 and such a right-eye image 58R as shown in (b) in FIG. 9 are obtained by the decoding, the offset calculation unit 152 performs pattern matching between an object included in the left-eye image 58L and an object included in the right-eye image 58R. By so doing, the offset calculation unit 152 calculates, as an offset, such a shift amount between the two objects as shown in (c) in FIG. 9. The offset is calculated as follows: for example, a block of a predetermined size (e.g., a block of 8×8 pixels) extracted from the right-eye image 58R is scanned on the left-eye image 58L, to obtain the position of a corresponding block, and the distance between the blocks is determined as the shift amount (offset). This offset is obtained every pixel or every couple of pixels and held in the offset frame memory 154. Furthermore, the offset calculation unit 152 updates the offset held in the offset frame memory 154, after every successful decode by both the L video decoder 142L and the R video decoder 142R.

The L frame data creation unit 156L creates the left-eye image 58L by shifting, for each pixel, the right-eye image 58R stored in the R frame memory 144R, rightward by the offset, based on the offset stored in the offset frame memory 154. For example, the right-eye image 58R shown in (b) in FIG. 9 is shifted rightward by the offset shown in (c) in FIG. 9, to generate such a pseudo left-eye image 58L as shown in (a) in FIG. 9.

Likewise, the R frame data creation unit 156R creates the right-eye image 58R by shifting, for each pixel, the left-eye image 58L stored in the L frame memory 144L, leftward by the offset, based on the offset stored in the offset frame memory 154. For example, the left-eye image 58L shown in (a) in FIG. 9 is shifted leftward by the offset shown in (c) in FIG. 9, to generate such a pseudo right-eye image 58R as shown in (b) in FIG. 9.

The selector 158L is connected to the L frame memory 144L and the L frame data creation unit 156L, and receives, as a control signal, data relating to whether or not the decode is successful, from the L video decoder 142L. According to the control signal, the selector 158L performs switching of input. Specifically, when a successful decode occurs in the L video decoder 142L, the selector 158L outputs the left-eye image 58L stored in the L frame memory 144L. When a decoding failure occurs in the L video decoder 142L, the selector 158L outputs the pseudo left-eye image 58L generated by the L frame data creation unit 156L.

Likewise, the selector 158R is connected to the R frame memory 144R and the R frame data creation unit 156R, and receives, as a control signal, data relating to whether or not the decode is successful, from the R video decoder 142R. According to the control signal, the selector 158R performs switching of input. Specifically, when a successful decode occurs in the R video decoder 142R, the selector 158R outputs the right-eye image 58R stored in the R frame memory 144R. When a decoding failure occurs in the R video decoder 142R, the selector 158R outputs the pseudo right-eye image 58R generated by the R frame data creation unit 156R.

Time-series processing of the 3D image processing apparatus 100 configured as above is described.

Figure 10:
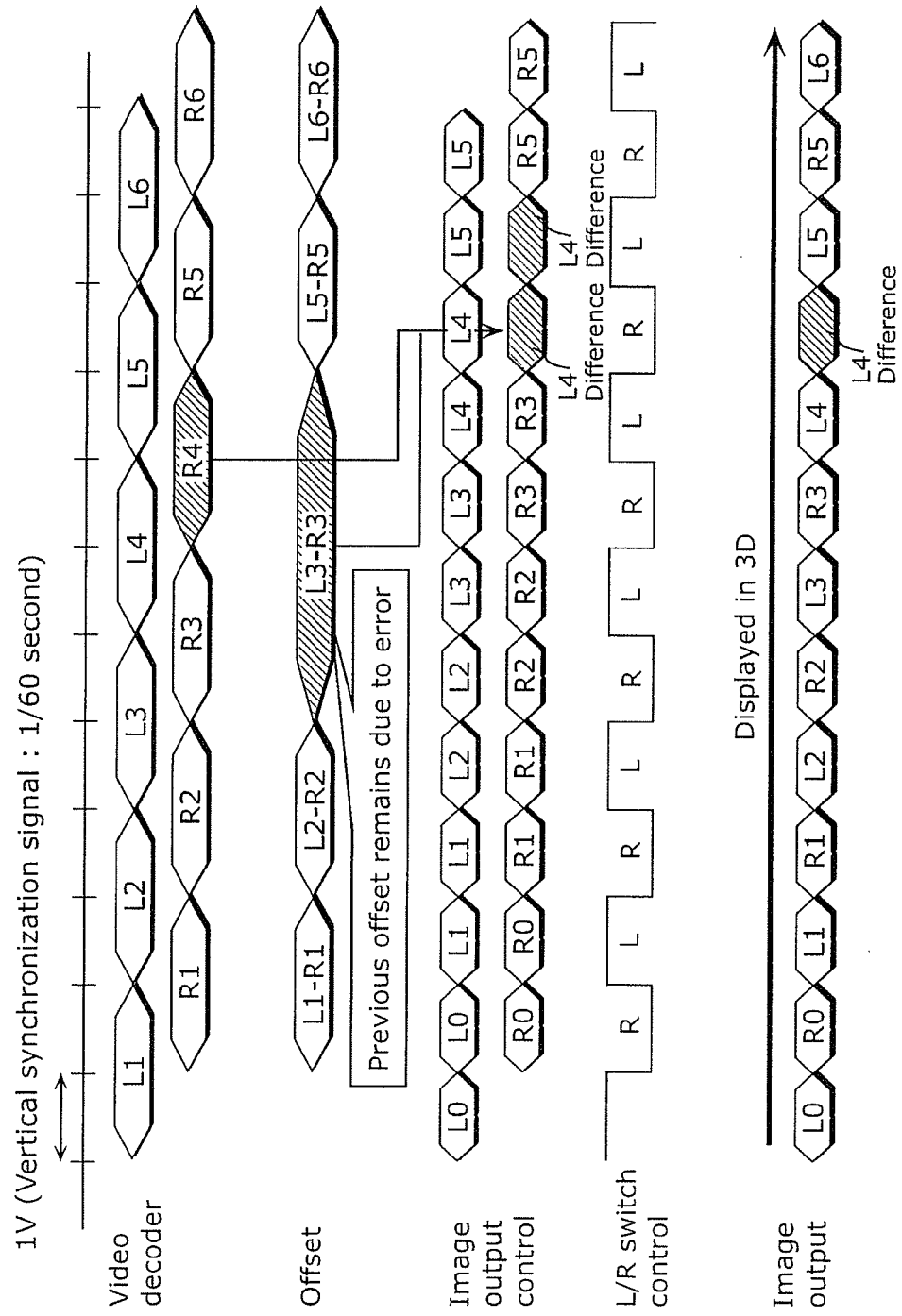
FIG. 10 is a timing chart of a process which the 3D image processing apparatus executes.

FIG. 10 is a timing chart of a process which the 3D image processing apparatus 100 executes. As shown in FIG. 10, the L video decoder 142L performs one decode per 2V period to generate the left-eye image 58L where one vertical synchronization period (hereinafter referred to as "1V period") is 1/60 second. The respective decoded left-eye images 58L are denoted by L1 to L6, and it is assumed that each of the left-eye images L1 to L6 is generated as a result of a successful decode.

In the meantime, the R video decoder 142R performs one decode per 2V period to generate the right-eye image 58R, at a point shifted in time by a 1V period from the point at which the L video decoder 142L performs the decode. The respective decoded right-eye images 58R are denoted by R1 to R6, and it is assumed that each of the right-eye images R1 to R3, R5, and R6 is generated as a result of a successful decode while there is a decoding failure to generate the right-eye image R4.

At this time, in the offset frame memory 154, an offset (L1−R1) calculated based on the left-eye image L1 and the right-eye image R1 is stored first. The offset is updated every 2V period, and in the next 2V period, an offset (L2−R2) calculated based on the left-eye image L2 and the right-eye image R2 is stored. In the next 2V period, an offset (L3−R3) calculated based on the left-eye image L3 and the right-eye image R3 is stored. In the next 2V period, an offset (L4−R4) calculated based on the left-eye image L4 and the right-eye image R4 should be stored, but there is a decoding failure to generate the right-eye image R4. In the offset frame memory 154, the offset (L3−R3) therefore remains stored. In the next 2V period, an offset (L5−R5) calculated based on the left-eye image L5 and the right-eye image R5 is stored. In the next 2V period, an offset (L6−R6) calculated based on the left-eye image L6 and the right-eye image R6 is stored.

The L image output control unit 148L outputs the left-eye images at 60p. It is to be noted that the L video decoder 142L generates the left-eye images at 30p. Thus, the L image output control unit 148L outputs the same image twice in series. For example, the L image output control unit 148L outputs the left-eye image L1 twice in series at intervals of 1/60 second. The L image output control unit 148L then outputs the left-eye image L2 twice in series at intervals of 1/60 second.

The R image output control unit 148R outputs the right-eye images at 60p. It is to be noted that the R image output control unit 148R outputs the same image twice in series for the same reason as the L image output control unit 148L. For example, the R image output control unit 148R outputs the right-eye image R2 twice in series at intervals of 1/60 second. The R image output control unit 148R then outputs the right-eye image R3 twice in series at intervals of 1/60 second. The R image output control unit 148R should then output the right-eye image R4 twice in series at intervals of 1/60 second, but there is a decoding failure to generate the right-eye image R4. Thus, the R image output control unit 148R outputs, twice in series, the pseudo right-eye image R4 (which is referred to as "L4 difference" in FIG. 10) generated by the R frame data creation unit 156R.

The L/R switch control unit 149 outputs, alternately at intervals of 1/60 second, signals to select the output of the L image output control unit 148L and the R image output control unit 148R. This causes the selector 150 to output the left-eye images and the right-eye images alternately at intervals of 1/60 second. This means that the selector 150 outputs images in the following order: the left-eye image L1, the right-eye image R1, the left-eye image L2, the right-eye image R2, and likewise. Since the right-eye image R4 is not present, the generated pseudo right-eye image R4 (L4 difference) is output next to the left-eye image L4.

As described above, the 3D image processing apparatus according to the present embodiment is capable of generating the pseudo image by shifting the successfully decoded image based on the offset, even in the case where the left-eye image or the right-eye image cannot be obtained due to a decoding failure or other factor. Thus, it is possible to generate images which bring no feeling of strangeness to viewers.

Third Embodiment

The third embodiment describes the 3D image processing apparatus 100 which is capable of switching from the 3D presentation to the 2D presentation, without blackout (that is a phenomenon which causes a screen to be black for a moment) upon the switching of the presentation.

The following will not repeat the descriptions overlapping with those in the first and second embodiments and mainly describes the differences between the first and second embodiments and the present embodiment.

Figure 11:
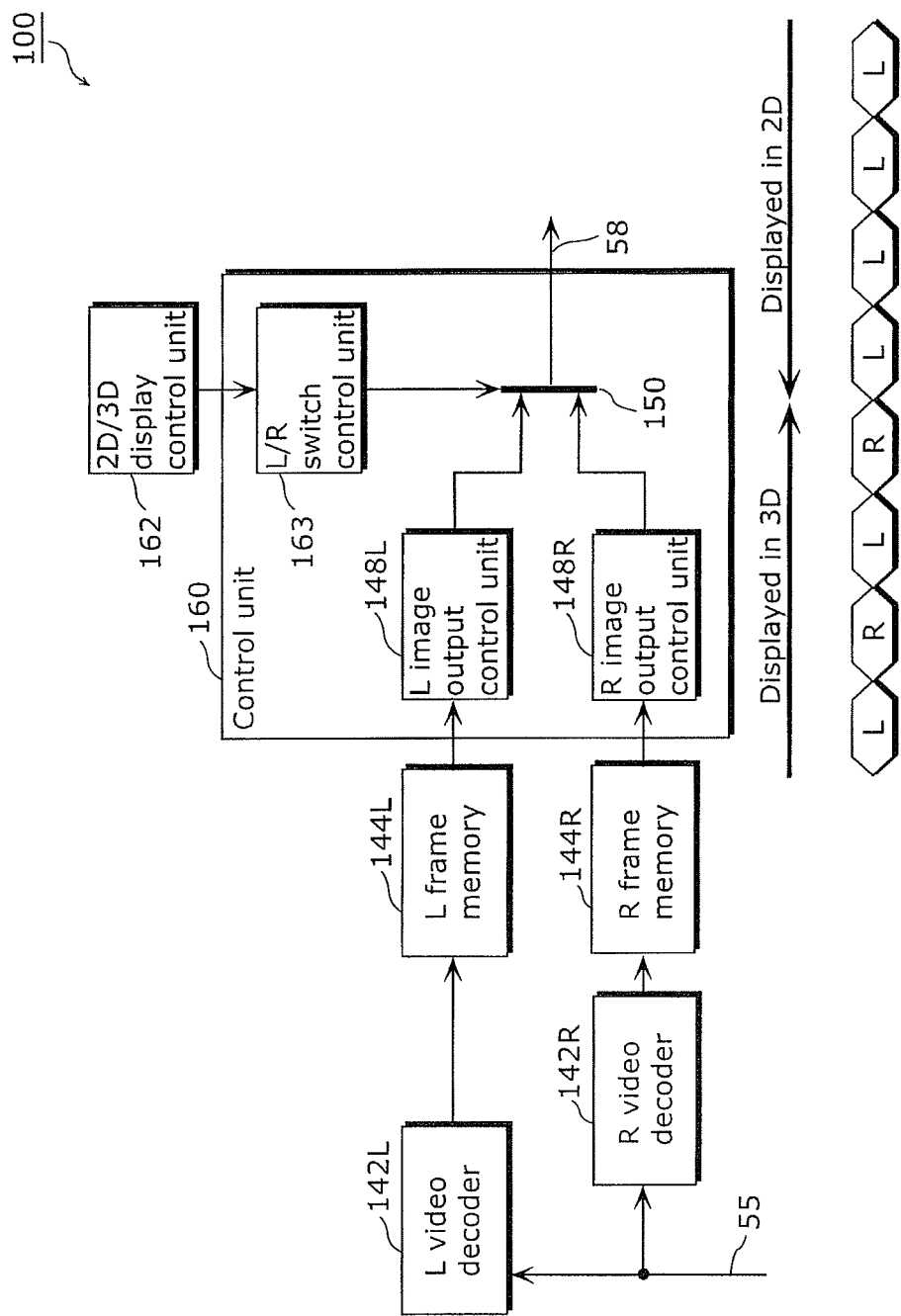
FIG. 11 is a block diagram showing a structure of a 3D image processing apparatus according to the third embodiment of the present invention.

FIG. 11 is a block diagram showing a structure of the 3D image processing apparatus 100 according to the third embodiment. This 3D image processing apparatus 100 is designed not to combine the video data and the graphic data, but only to decode the video data. Furthermore, the 3D image processing apparatus 100B has a like structure as the 3D image processing apparatus 100. Detailed descriptions on the 3D image processing apparatus 100B will therefore not be repeated.

The 3D image processing apparatus 100 includes the L video decoder 142L, the R video decoder 142R, the L frame memory 144L, the R frame memory 144R, a 2D/3D display control unit 162, and a control unit 160.

The L video decoder 142L, the R video decoder 142R, the L frame memory 144L, and the R frame memory 144R are the same or like as those according to the second embodiment which have been described with reference to FIG. 8. Detailed descriptions on these components will therefore not be repeated.

The 2D/3D display control unit 162 switches the 2D presentation or the 3D presentation. This switching may be performed based on a user instruction or may be performed based on a preset criterion. For example, the presentation may be switched based on a switch signal of the 2D presentation or the 3D presentation included in the broadcast waves 42. The 2D/3D display control unit 162 instructs a later-described L/R switch control unit 163 of the control unit 160 to switch the presentation.

Next, a detailed structure of the control unit 160 is described.

As shown in FIG. 11, the control unit 160 includes the L image output control unit 148L, the R image output control unit 148R, the selector 150, and the L/R switch control unit 163.

The L image output control unit 148L and the R image output control unit 148R are the same or like as those according to the second embodiment which have been described with reference to FIG. 8. Detailed descriptions on these components will therefore not be repeated.

When receiving, from the 2D/3D display control unit 162, an instruction to switch to the 3D presentation, the L/R switch control unit 163 operates in the same or like manner as the L/R switch control unit 149 according to the second embodiment. Specifically, the L/R switch control unit 163 generates a control signal such that the selector 150 outputs, alternately at 60p, the left-eye images 58L controlled to output by the L image output control unit 148L, and the right-eye images 58R controlled to output by the R image output control unit 148R, and then outputs the generated control signal to the selector 150. According to the control signal from the L/R switch control unit 149, the selector 150 outputs the left-eye images 58L and the right-eye images 58R alternately at 60p.

On the other hand, when receiving, from the 2D/3D display control unit 162, an instruction to switch to the 2D presentation, the L/R switch control unit 163 generates the control signal such that the selector 150 outputs, at 60p, the left-eye image 58L controlled to output by the L image output control unit 148L, and then outputs the generated control signal to the selector 150. According to the control signal from the L/R switch control unit 149, the selector 150 outputs the left-eye images 58L at 60p. At this time, in the case where the L video decoder 142L performs the decodes at intervals of 1/30 second only, the selector 150 outputs the same left-eye image 58L twice in series to achieve the output at 60p.

As described above, in the 3D image processing apparatus according to the third embodiment, the frame rate for presentation is the same in the 3D presentation and in the 2D presentation. Accordingly, even in the case where the presentation is switched, the display panel is capable of displaying, at the same frame rate, the image data received from the 3D image processing apparatus, without special processes. Thus, no blackout occurs at the time of switching between the 3D presentation and the 2D presentation, which makes it possible to generate images which bring no feeling of strangeness to viewers.

Fourth Embodiment

In the third embodiment, the presentation is switched from the 3D to 2D based on a user instruction or a preset criterion. The present embodiment describes the 3D image processing apparatus 100 which is additionally capable of switching the presentation to 2D when a decoding failure occurs during the 3D presentation.

The following will not repeat the descriptions overlapping with those in the first to third embodiments and mainly describes the differences between the first to third embodiments and the present embodiment.

Figure 12:
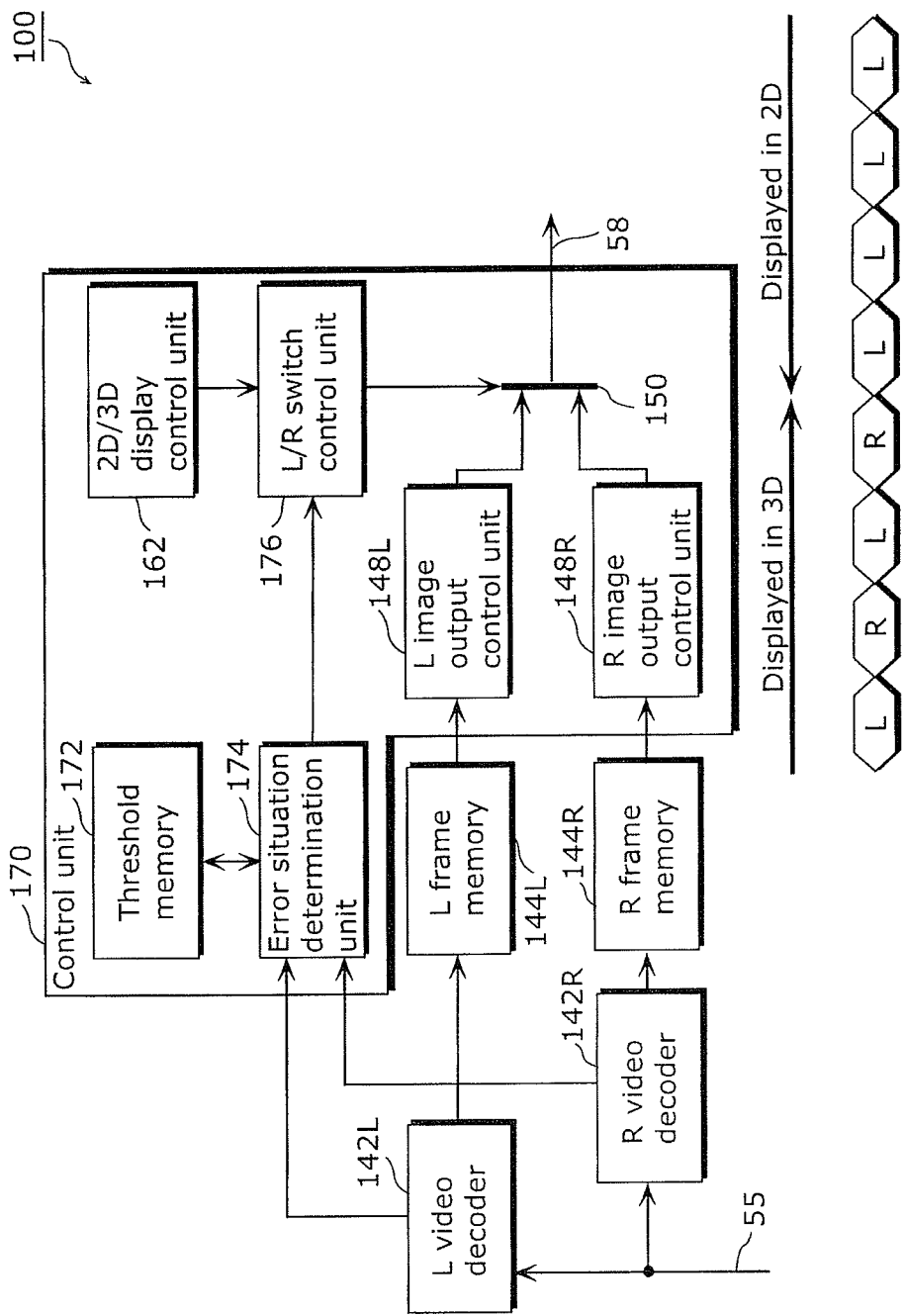
FIG. 12 is a block diagram showing a structure of a 3D image processing apparatus according to the fourth embodiment of the present invention.

FIG. 12 is a block diagram showing a structure of the 3D image processing apparatus 100 according to the fourth embodiment. This 3D image processing apparatus 100 is designed not to combine the video data and the graphic data, but only to decode the video data. Furthermore, the 3D image processing apparatus 100B has a like structure as the 3D image processing apparatus 100. Detailed descriptions on the 3D image processing apparatus 100B will therefore not be repeated.

The 3D image processing apparatus 100 includes the L video decoder 142L, the R video decoder 142R, the L frame memory 144L, the R frame memory 144R, and a control unit 170.

The L video decoder 142L, the R video decoder 142R, the L frame memory 144L, and the R frame memory 144R are the same or like as those according to the second embodiment which have been described with reference to FIG. 8. Detailed descriptions on these components will therefore not be repeated.

Next, a detailed structure of the control unit 170 is described.

As shown in FIG. 12, the control unit 170 includes the L image output control unit 148L, the R image output control unit 148R, the selector 150, the 2D/3D display control unit 162, a threshold memory 172, an error situation determination unit 174, and an L/R switch control unit 176.

The L image output control unit 148L and the R image output control unit 148R are the same or like as those according to the second embodiment which have been described with reference to FIG. 8. Detailed descriptions on these components will therefore not be repeated.

The 2D/3D display control unit 162 is the same or like as that described in the third embodiment.

The error situation determination unit 174 calculates an error rate of each of the L video decoder 142L and the R video decoder 142R, and compares the error rate with a preset threshold stored in the threshold memory 172, to determine whether or not a decoding failure occurs in one of the L video decoder 142L and the R video decoder 142R. Specifically, when the decoding error rate is higher than the preset threshold, the error situation determination unit 174 determines that there is a decoding failure, while, when the decoding error rate is equal to or lower than the preset threshold, the error situation determination unit 174 determines that the decode is successful. When the error situation determination unit 174 determines that there is a decoding error, the error situation determination unit 174 outputs, to the L/R switch control unit 176, information for identifying a decoder in which the decoding error occurs.

As in the case of the L/R switch control unit 163 described in the third embodiment, the L/R switch control unit 176 outputs, to the selector 150, a control signal for switching the input of the selector 150, based on the switching instruction from the 2D/3D display control unit 162. In addition, when the error situation determination unit 174 determines that there is a decoding failure in a decoder, the L/R switch control unit 176 outputs, to the selector 150, a control signal for switching the presentation from 3D to 2D.

Specifically, when the error situation determination unit 174 determines that there is a decoding failure in the L video decoder 142L and the decoding by the R video decoder 142R is successful, the L/R switch control unit 176 generates the control signal such that the selector 150 outputs, at 60p, the right-eye images 58R controlled to output by the R image output control unit 148R, and outputs the generated control signal to the selector 150. According to the control signal from the L/R switch control unit 176, the selector 150 outputs the right-eye images 58R at 60p. At this time, in the case where the R video decoder 142R performs the decodes at intervals of 1/30 second only, the selector 150 outputs the same right-eye image 58R twice in series to achieve the output at 60p.

Likewise, when the error situation determination unit 174 determines that the decoding by the L video decoder 142L is successful and there is a decoding failure in the R video decoder 142R, the L/R switch control unit 176 generates the control signal such that the selector 150 outputs, at 60p, the left-eye images 58L controlled to output by the L image output control unit 148L, and outputs the generated control signal to the selector 150. According to the control signal from the L/R switch control unit 176, the selector 150 outputs the left-eye images 58L at 60p. At this time, in the case where the L video decoder 142L performs the decodes at intervals of 1/30 second only, the selector 150 outputs the same left-eye image 58L twice in series to achieve the output at 60p.

Time-series processing of the 3D image processing apparatus 100 configured as above is described.

Figure 13:
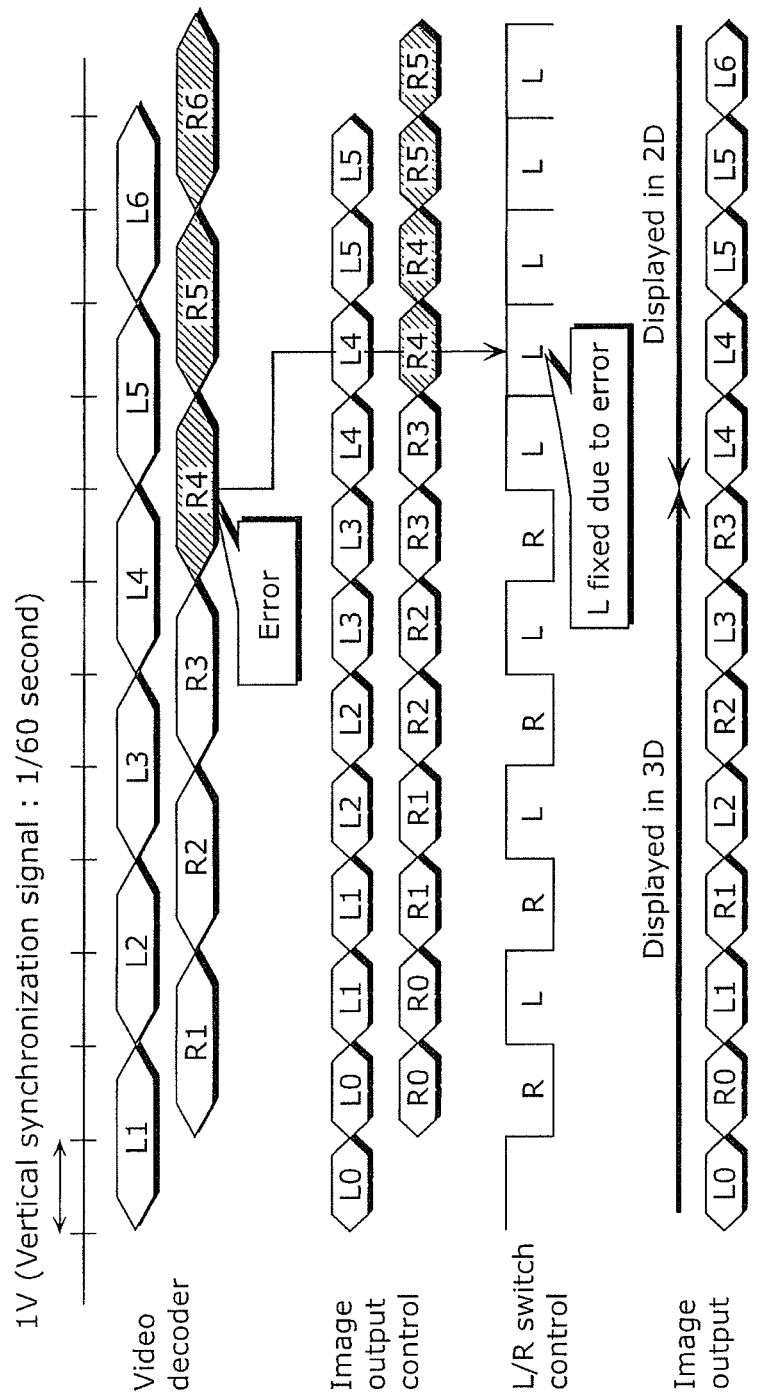
FIG. 13 is a timing chart of a process which the 3D image processing apparatus executes.

FIG. 13 is a timing chart of a process which the 3D image processing apparatus 100 executes. As shown in FIG. 13, the L video decoder 142L performs one decode per 2V period to generate the left-eye image 58L. The respective decoded left-eye images 58L are denoted by L1 to L6, and it is assumed that each of the left-eye images L1 to L6 is generated as a result of a successful decode.

In the meantime, the R video decoder 142R performs one decode per 2V period to generate the right-eye image 58R, at a point shifted in time by a 1V period from the point at which the L video decoder 142L performs the decode. The respective decoded right-eye images 58R are denoted by R1 to R6, and it is assumed that each of the right-eye images R1 to R3 is generated as a result of a successful decode while there are decoding failures to generate the right-eye images R4 to R6.

At this time, the L image output control unit 148L outputs the left-eye images at 60p. It is to be noted that the L video decoder 142L generates the left-eye images at 30p. Thus, the L image output control unit 148L outputs the same image twice in series. For example, the L image output control unit 148L outputs the left-eye image L1 twice in series at intervals of 1/60 second. The L image output control unit 148L then outputs the left-eye image L2 twice in series at intervals of 1/60 second.

The R image output control unit 148R outputs the right-eye images at 60p. It is to be noted that the R image output control unit 148R outputs the same image twice in series for the same reason as the L image output control unit 148L.

The L/R switch control unit 176 outputs, alternately at intervals of 1/60 second, signals to select the output of the L image output control unit 148L and the R image output control unit 148R. This causes the selector 150 to output the left-eye images and the right-eye images alternately at intervals of 1/60 second. This means that the selector 150 outputs images in the following order: the left-eye image L1, the right-eye image R1, the left-eye image L2, the right-eye image R2, and likewise. In the R video decoder 142R, there is a decoding failure to generate the right-eye image R4. Thus, at the output of the right-eye image R4, the L/R switch control unit 176 controls the selector 150 to output only the left-eye images. By so doing, the presentation can be switched to 2D in which only the left-eye images are output, while decoding failures occur in the R video decoder 142R in generating the right-eye images. In the case where there are decoding failures to generate the left-eye images, the same or like process is performed with the only difference being right or left.

Figure 14:
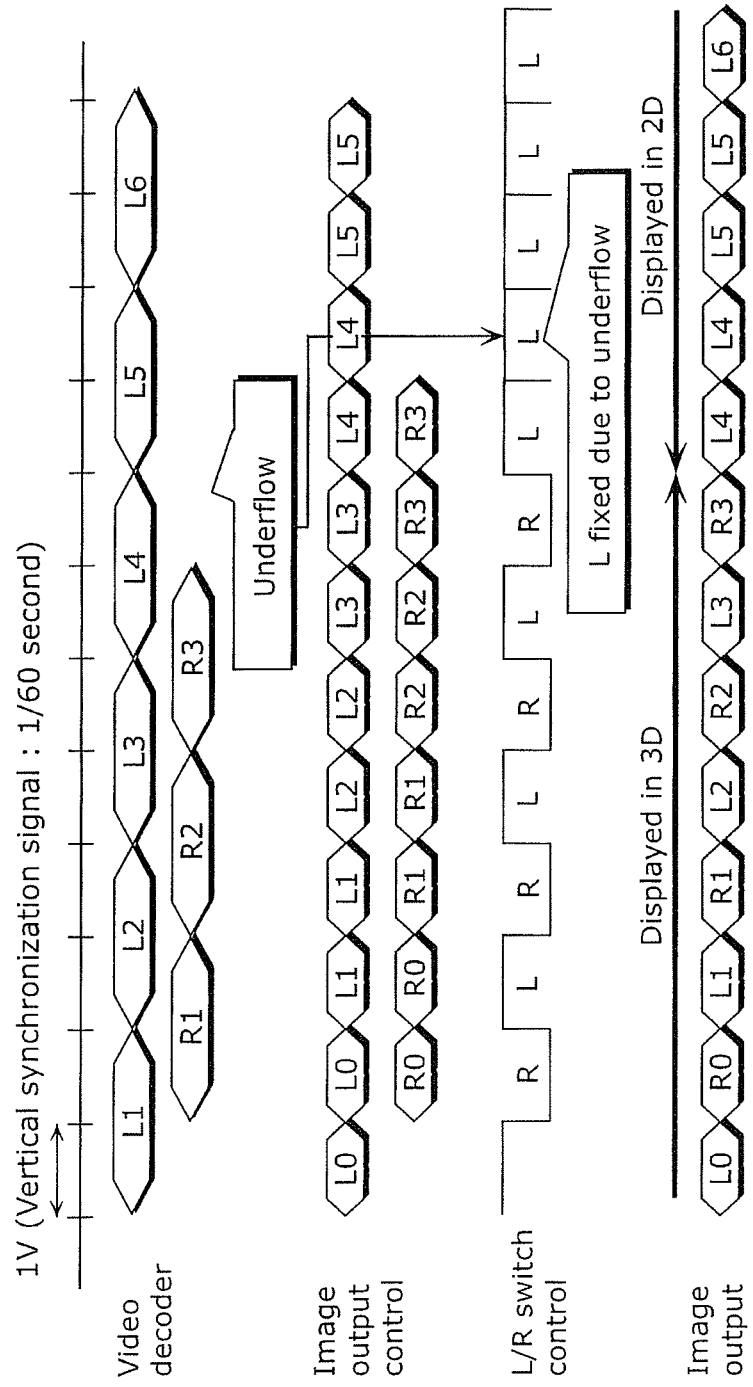
FIG. 14 is another timing chart of the process which the 3D image processing apparatus executes.

FIG. 14 is another timing chart of the process which the 3D image processing apparatus 100 executes. The example of FIG. 14 shows the case where the images following the right-eye image R3 are missing, resulting in an underflow in the R frame memory 144R. Such an underflow occurs often after content reproduction.

As in the case of FIG. 13, the L video decoder 142L performs one decode per 2V period to generate the left-eye image 58L. The respective decoded left-eye images 58L are denoted by L1 to L6, and it is assumed that each of the left-eye images L1 to L6 is generated as a result of a successful decode.

In the meantime, the R video decoder 142R performs one decode per 2V period to generate the right-eye image 58R, at a point shifted in time by a 1V period from the point at which the L video decoder 142L performs the decode. In this figure, each of the right-eye images R1 to R3 is generated as a result of a successful decode while the images following the right-eye image R3 are missing.

At this time, the L image output control unit 148L outputs the left-eye images at 60p. It is to be noted that the L video decoder 142L generates the left-eye images at 30p. Thus, the L image output control unit 148L outputs the same image twice in series. For example, the L image output control unit 148L outputs the left-eye image L1 twice in series at intervals of 1/60 second. The L image output control unit 148L then outputs the left-eye image L2 twice in series at intervals of 1/60 second.

The R image output control unit 148R outputs the right-eye images at 60p. It is to be noted that the R image output control unit 148R outputs the same image twice in series for the same reason as the L image output control unit 148L. After outputting the right-eye image R3, the R image output control unit 148R stops to output the images because there are no images to output.

The L/R switch control unit 176 outputs, alternately at intervals of 1/60 second, signals to select the output of the L image output control unit 148L and the R image output control unit 148R. This causes the selector 150 to output the left-eye images and the right-eye images alternately at intervals of 1/60 second. This means that the selector 150 outputs images in the following order: the left-eye image L1, the right-eye image R1, the left-eye image L2, the right-eye image R2, and likewise. Since there is no image next to the right-eye image R3, the R video decoder 142R will have a decoding failure. Thus, at the output of the image next to the right-eye image R3, the L/R switch control unit 176 controls the selector 150 to output only the left-eye images. By so doing, the presentation can be switched to 2D in which only the left-eye images are output, while the right-eye images are missing and there is an underflow in the R frame memory 144R. In the case where the left-eye images are missing and there is an underflow in the L frame memory 144L, the same or like process is performed with the only difference being right or left.

Figure 15:
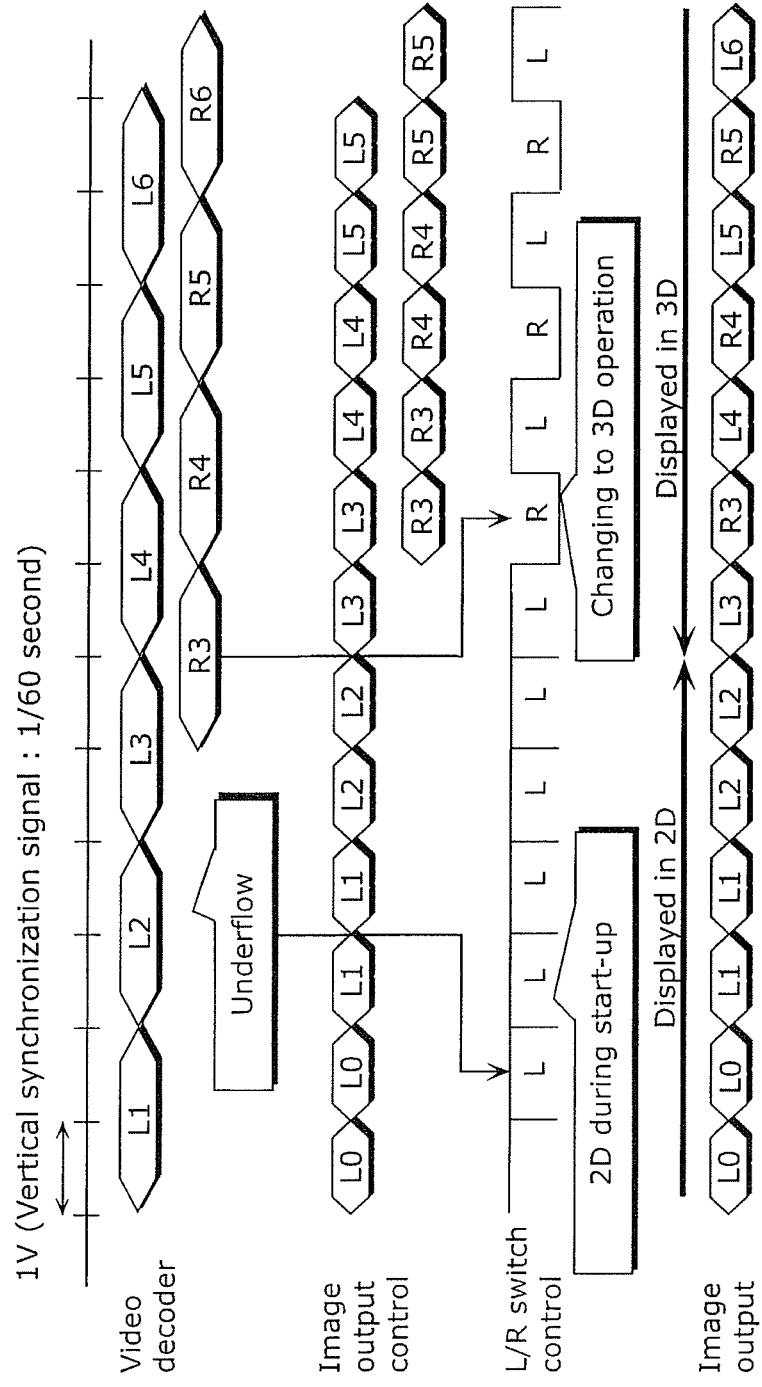
FIG. 15 is a yet another timing chart of the process which the 3D image processing apparatus executes.

FIG. 15 is a yet another timing chart of the process which the 3D image processing apparatus 100 executes. The example of FIG. 15 shows the case where the images preceding the right-eye image R3 are missing, resulting in an underflow in the R frame memory 144R. Such an underflow occurs often at the start of content reproduction.

As in the case of FIG. 13, the L video decoder 142L performs one decode per 2V period to generate the left-eye image 58L. The respective decoded left-eye images 58L are denoted by L1 to L6, and it is assumed that each of the left-eye images L1 to L6 is generated as a result of a successful decode.

In the meantime, the R video decoder 142R performs one decode per 2V period to generate the right-eye image 58R, at a point shifted in time by a 1V period from the point at which the L video decoder 142L performs the decode. In this figure, each of the right-eye images R3 to R6 is generated as a result of a successful decode while the images preceding the right-eye image R3 are missing.

At this time, the L image output control unit 148L outputs the left-eye images at 60p. It is to be noted that the L video decoder 142L generates the left-eye images at 30p. Thus, the L image output control unit 148L outputs the same image twice in series. For example, the L image output control unit 148L outputs the left-eye image L1 twice in series at intervals of 1/60 second. The L image output control unit 148L then outputs the left-eye image L2 twice in series at intervals of 1/60 second.

The R image output control unit 148R outputs the right-eye images at 60p. It is to be noted that the R image output control unit 148R outputs the same image twice in series for the same reason as the L image output control unit 148L. Before outputting the right-eye image R3, the R image output control unit 148R stops to output the images because there are no images to output.

The L/R switch control unit 176 outputs, alternately at intervals of 1/60 second, signals to select the output of the L image output control unit 148L and the R image output control unit 148R. This causes the selector 150 to output the left-eye images and the right-eye images alternately at intervals of 1/60 second. Since there is no image prior to the right-eye image R3, the R video decoder 142R will have a decoding failure. Thus, at the start of the 3D image processing apparatus 100, the L/R switch control unit 176 controls the selector 150 to output only the left-eye images. By so doing, the presentation can be switched to 2D in which only the left-eye images are output while the right-eye images are missing and there is an underflow in the R frame memory 144R. Subsequently, when the R video decoder 142R generates the right-eye image R3 as a result of decoding, the L/R switch control unit 176 outputs, at the point in time when the R image output control unit 148R outputs the right-eye image R3, signals to select the output of the L image output control unit 148L and the R image output control unit 148R, alternately at intervals of 1/60 seconds. This causes the selector 150 to output the left-eye images and the right-eye images alternately at intervals of 1/60 second. Through such processing, the presentation can be switched to 2D in which only the left-eye images are output, while the right-eye images are missing and there is an underflow in the R frame memory 144R. In the case where the left-eye images are missing and there is an underflow in the L frame memory 144L, the same or like process is performed with the only difference being right or left.

As described above, the 3D image processing apparatus according to the fourth embodiment is capable of switching the presentation from 3D to 2D by keeping on displaying the successfully decoded images, even when there is a decoding failure to generate one of the left-eye image and the right-eye image or when one of the left-eye image and the right-eye image is missing. Furthermore, the frame rate for presentation is the same in the 3D presentation and in the 2D presentation. Accordingly, even in the case where the presentation is switched, the display panel is capable of displaying, at the same frame rate, the image data received from the 3D image processing apparatus, without special processes. Thus, no blackout occurs at the time of switching between the 3D presentation and the 2D presentation, which makes it possible to generate images which bring no feeling of strangeness to viewers.

(Variation of Fourth Embodiment)

In the fourth embodiment, images are generated which bring no feeling of strangeness to viewers, by switching the presentation from 3D to 2D when there is a decoding failure to generate one of the left-eye image and the right-eye image. However, in the case where a decoding failure is momentary, instantaneous switching to the 2D presentation will, to the contrary, bring a feeling of strangeness to viewers.

Thus, in the present variation, the presentation is switched from 3D to 2D only when the number of consecutive decoding failures is equal to or more than a given number, and the presentation is not switched to 2D when the number of consecutive decoding failures is less than the given number. Such determination is made by the L/R switch control unit 176 shown in FIG. 12.

Furthermore, when a decoding failure occurs in the L video decoder 142L, the L image output control unit 148L according to the present variation reads outs, from the L frame memory 144L, not the image with a decoding failure but the latest successfully decoded image to output. The R image output control unit 148R performs the same or like processing.

The structure in the present variation is the same or like as that of the 3D image processing apparatus 100 according to the fourth embodiment shown in FIG. 12 except the L/R switch control unit 176, the L image output control unit 148L, and the R image output control unit 148R. Detailed descriptions on the other components will therefore not be repeated.

Figure 16:
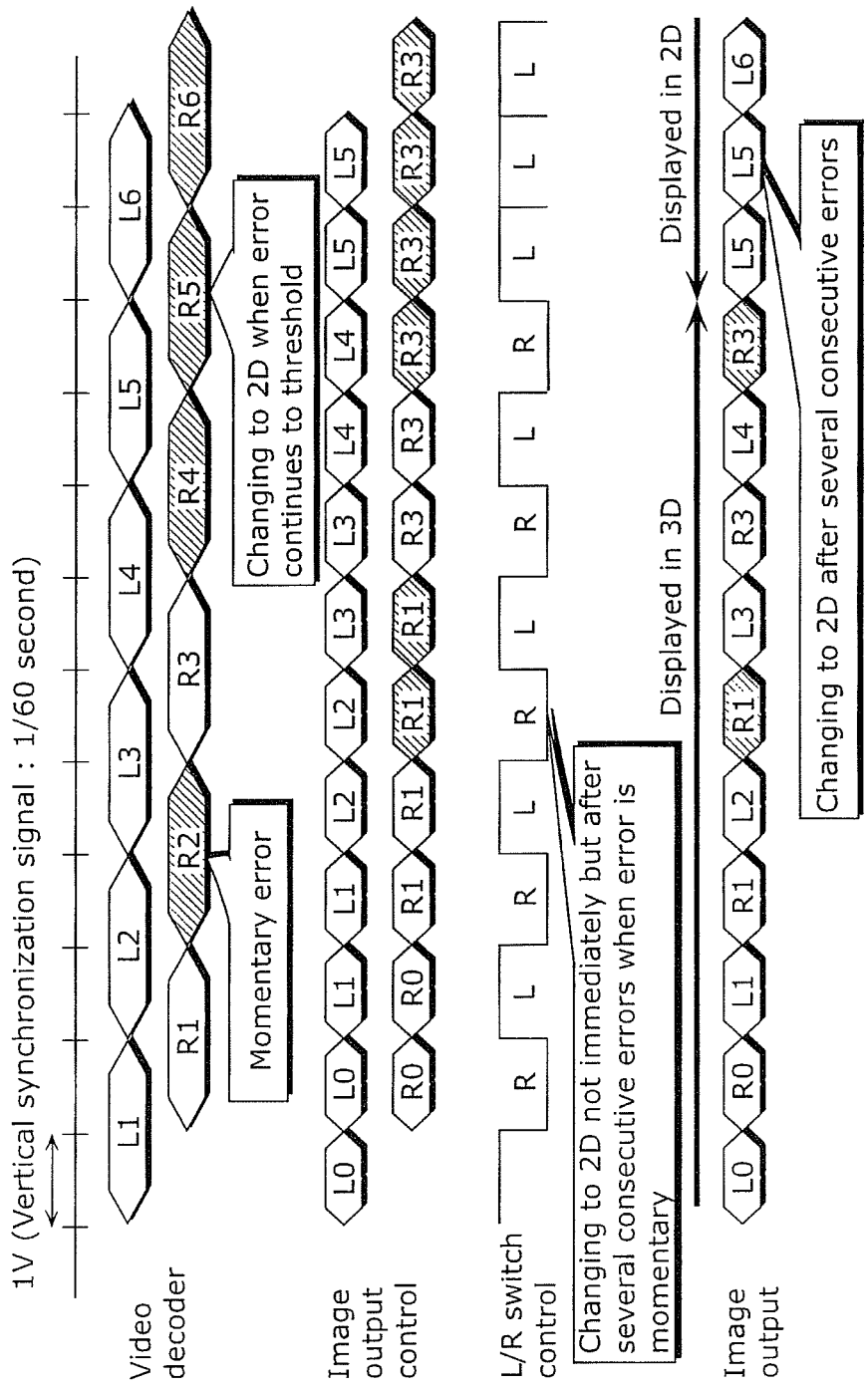
FIG. 16 is a timing chart of a process which a 3D image processing apparatus according to the fourth embodiment of the present invention executes.

FIG. 16 is a timing chart of a process which the 3D image processing apparatus 100 according to the variation of the fourth embodiment executes. Here, the above given number is set to be two as an example. As shown in FIG. 16, the L video decoder 142L performs one decode per 2V period to generate the left-eye image 58L. The respective decoded left-eye images 58L are denoted by L1 to L6, and it is assumed that each of the left-eye images L1 to L6 is generated as a result of a successful decode.

In the meantime, the R video decoder 142R performs one decode per 2V period to generate the right-eye image 58R, at a point shifted in time by a 1V period from the point at which the L video decoder 142L performs the decode. The respective decoded right-eye images 58R are denoted by R1 to R6, and it is assumed that each of the right-eye images R1 and R3 is generated as a result of a successful decode while there are decoding failures to generate the right-eye images R2 and R4 to R6.

At this time, the L image output control unit 148L outputs the left-eye images at 60p. It is to be noted that the L video decoder 142L generates the left-eye images at 30p. Thus, the L image output control unit 148L outputs the same image twice in series. For example, the L image output control unit 148L outputs the left-eye image L1 twice in series at intervals of 1/60 second. The L image output control unit 148L then outputs the left-eye image L2 twice in series at intervals of 1/60 second.

The R image output control unit 148R outputs the right-eye images at 60p. It is to be noted that the R image output control unit 148R outputs the same image twice in series for the same reason as the L image output control unit 148L. Since there is a decoding failure in the right-eye image R2, the R image output control unit 148R outputs the successfully decoded right-eye image R1 at the point in time to output the right-eye image R2. Furthermore, since there are decoding failures to generate the right-eye images R4 to R6, the R image output control unit 148R outputs the successfully decoded right-eye image R3 at the points in time to output the right-eye images R4 to R6.

The L/R switch control unit 176 outputs, alternately at intervals of 1/60 second, signals to select the output of the L image output control unit 148L and the R image output control unit 148R. This causes the selector 150 to output the left-eye images and the right-eye images alternately at intervals of 1/60 second. This means that the selector 150 outputs images in the following order: the left-eye image L1, the right-eye image R1, the left-eye image L2, the right-eye image R2, and likewise. In the R video decoder 142R, there is a decoding failure to generate the right-eye image R2. However, the number of consecutive decoding failures is one, which is less than the given number. The L/R switch control unit 176 therefore makes no change in the processing. Subsequently, after the R video decoder 142R generates the right-eye image R3 as a result of a successful decode, three decoding failures occur consecutively in the R video decoder 142R in generating the right-eye images (the right-eye images R4 to R6). As a result, at the time of the decoding attempt to generate the right-eye image R5, the number of consecutive decoding failures is no less than the given number. Thus, the L/R switch control unit 176 controls the selector 150 to output only the left-eye image at the inherent point in time to output the right-eye image R5. By so doing, the presentation can be switched to 2D in which only the left-eye images are output, only when there are a given number of consecutive decoding failures. When the number of consecutive decoding failures is less than the given number, the right-eye image generated as a result of a successful decode is output. In the case where there are decoding failures to generate the left-eye images, the same or like process is performed with the only difference being right or left.

As described above, the 3D image processing apparatus according to the variation of the fourth embodiment changes the presentation from 3D to 2D only when the number of consecutive decoding failures is equal to or more than a given number. This can prevent frequent switching of the presentation between 2D and 3D. Furthermore, when there is a decoding failure to generate an image to be displayed in 3D, the latest successfully decoded image is displayed. As a result, no noise-containing images are displayed. Thus, it is possible to generate images which bring no feeling of strangeness to viewers.

Fifth Embodiment

The fourth embodiment describes the 3D image processing apparatus which switches the presentation to 2D when there is a decoding failure during the 3D presentation and in which the presentation is instantaneously switched from 3D to 2D. The present embodiment describes the 3D image processing apparatus 100 which is capable of consecutively switching the presentation from 3D to 2D.

The following will not repeat the descriptions overlapping with those in the first to fourth embodiments and mainly describes the differences between the first to fourth embodiments and the present embodiment.

Figure 17:
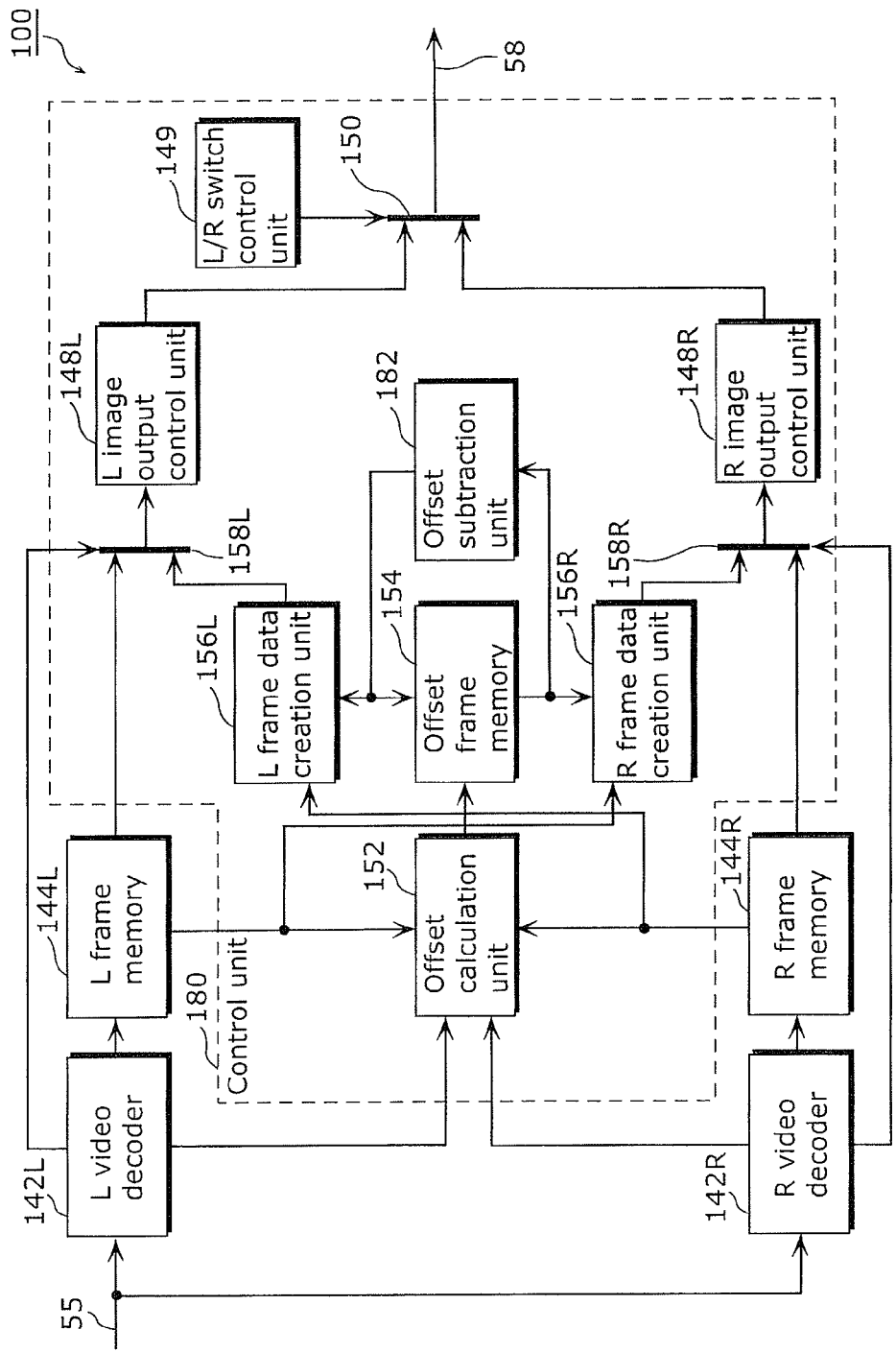
FIG. 17 is a block diagram showing a structure of a 3D image processing apparatus according to the fifth embodiment of the present invention.

FIG. 17 is a block diagram showing a structure of the 3D image processing apparatus 100 according to the fifth embodiment. This 3D image processing apparatus 100 is designed not to combine the video data and the graphic data, but only to decode the video data. Furthermore, the 3D image processing apparatus 100B has a like structure as the 3D image processing apparatus 100. Detailed descriptions on the 3D image processing apparatus 100B will therefore not be repeated.

The 3D image processing apparatus 100 includes the L video decoder 142L, the R video decoder 142R, the L frame memory 144L, the R frame memory 144R, and a control unit 180.

The L video decoder 142L, the R video decoder 142R, the L frame memory 144L, and the R frame memory 144R are the same or like as those according to the second embodiment which have been described with reference to FIG. 8. Detailed descriptions on these components will therefore not be repeated.

Next, a detailed structure of the control unit 180 is described.

As shown in FIG. 17, the control unit 180 includes the offset calculation unit 152, the offset frame memory 154, the L frame data creation unit 156L, the R frame data creation unit 156R, the selector 158L, the selector 158R, an offset subtraction unit 182, the L image output control unit 148L, the R image output control unit 148R, the L/R switch control unit 149, and the selector 150.

Each of the offset calculation unit 152, the offset frame memory 154, the L frame data creation unit 156L, the R frame data creation unit 156R, the selector 158L, the selector 158R, the L image output control unit 148L, the R image output control unit 148R, the L/R switch control unit 149, and the selector 150 has the same structure as a corresponding one in the 3D image processing apparatus 100 according to the second embodiment shown in FIG. 8.

The offset subtraction unit 182 subtracts a preset positive value n from each of the offsets which is determined for each pixel or every couple of pixels and stored in the offset frame memory 154, in synchronization with the timing of decodes in the L video decoder 142L or the timing of decodes in the R video decoder 142R, when a decoding failure occurs in the L video decoder 142L or the R video decoder 142R. When the offset becomes 0 or less as a result of the subtraction, the offset subtraction unit 182 sets the offset to be 0.

Time-series processing of the 3D image processing apparatus 100 configured as above is described.

Figure 18:
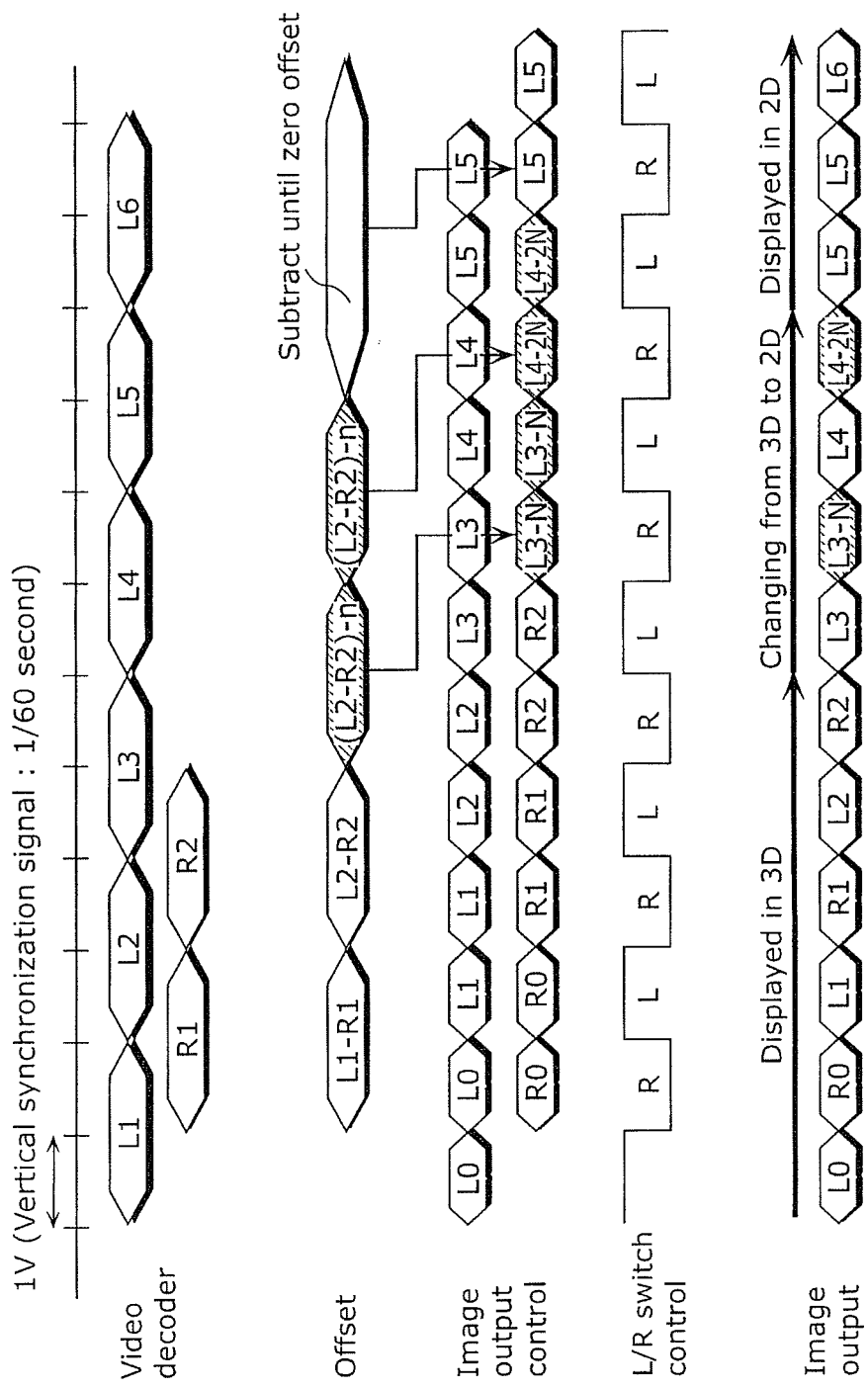
FIG. 18 is a timing chart of a process which the 3D image processing apparatus executes.

FIG. 18 is a timing chart of the process which the 3D image processing apparatus 100 executes. The example of FIG. 18 shows the case where the images following the right-eye image R2 are missing, resulting in an underflow in the R frame memory 144R. Such an underflow occurs often at the end of content reproduction.

The L video decoder 142L performs one decode per 2V period to generate the left-eye image 58L. The respective decoded left-eye images 58L are denoted by L1 to L6, and it is assumed that each of the left-eye images L1 to L6 is generated as a result of a successful decode.

In the meantime, the R video decoder 142R performs one decode per 2V period to generate the right-eye image 58R, at a point shifted in time by a 1V period from the point at which the L video decoder 142L performs the decode. In this figure, each of the right-eye images R1 and R2 is generated as a result of a successful decode while the images following the right-eye image R2 are missing.

At this time, in the offset frame memory 154, an offset (L1−R1) calculated based on the left-eye image L1 and the right-eye image R1 is stored first. The offset is updated every 2V period, and in the next 2V period, an offset (L2−R2) calculated based on the left-eye image L2 and the right-eye image R2 is stored. In the next 2V period, an offset (L3–R3) calculated based on the left-eye image L3 and the right-eye image R3 should be stored, but the images following the right-eye image R2 are missing. The offset subtraction unit 182 therefore subtracts the preset positive value n from the offset (L2–R2) and stores (L2–R2)–n in the offset frame memory 154. Furthermore, in the next 2V period, (L2–R2)–2n obtained by the offset subtraction unit 182 subtracting the preset positive value n from the offset (L2–R2)–n is stored in the offset frame memory 154. The offset subtraction unit 182 keeps on subtracting the positive value n from the offset stored in the offset frame memory 154, every 2V period until the offset becomes 0.

The L image output control unit 148L outputs the left-eye images at 60p. It is to be noted that the L video decoder 142L generates the left-eye images at 30p. Thus, the L image output control unit 148L outputs the same image twice in series. For example, the L image output control unit 148L outputs the left-eye image L1 twice in series at intervals of 1/60 second. The L image output control unit 148L then outputs the left-eye image L2 twice in series at intervals of 1/60 second.

The R image output control unit 148R outputs the right-eye images at 60p. It is to be noted that the R image output control unit 148R outputs the same image twice in series for the same reason as the L image output control unit 148L. For example, the R image output control unit 148R outputs the right-eye image R1 twice in series at intervals of 1/60 second. The R image output control unit 148R then outputs the right-eye image R2 twice in series at intervals of 1/60 second. The R image output control unit 148R should then output the right-eye image R3 twice in series at intervals of 1/60 second, but the images following the right-eye image R2 are not present. Thus, the R image output control unit 148R outputs, twice in series, the pseudo right-eye image (which is referred to as "L3–N" in FIG. 18) generated by the R frame data creation unit 156R. Here, the right-eye image L3–N is an image obtained by shifting the latest left-eye image L3 leftward by the offset (L2–R2)–n stored in the offset frame memory 154. The R image output control unit 148R then outputs, twice in series, the pseudo right-eye image (which is referred to as "L4–2N" in FIG. 18) generated by the R frame data creation unit 156R. Here, the right-eye image L4–2N is an image obtained by shifting the latest left-eye image L4 leftward by the offset (L2–R2)–2n stored in the offset frame memory 154. Since the offset stored in the offset frame memory 154 gradually approaches 0, the shift amount between the left-eye image and the right-eye image ultimately becomes 0, with the result that the R image output control unit 148R outputs the same image as the left-eye image which the L image output control unit 148L outputs. Assume that the offset becomes 0 as a result of further subtraction of the preset positive value n from the offset (L2–R2)–2n. At this time, the R frame data creation unit 156R generates, as the right-eye image, the same image as the left-eye image L5, and the R image output control unit 148R accordingly outputs, as the right-eye image, the same image as the left-eye image L5.

The L/R switch control unit 149 outputs, alternately at intervals of 1/60 second, signals to select the L image output control unit 148L and the R image output control unit 148R. This causes the selector 150 to output the left-eye images and the right-eye images alternately at intervals of 1/60 second. This means that the selector 150 outputs images in the following order: the left-eye image L1, the right-eye image R1, the left-eye image L2, and the right-eye image R2. Subsequently, the images are output in the following order: the left-eye image L3, the right-eye image L3–N, the left-eye image L4, and the right-eye image L4–2N, while the offset in generating the right-eye image gradually approaches 0. This means that the shift amount between the left-eye image and the right-eye image is gradually eliminated so that the presentation can be smoothly transit from 3D to 2D. Subsequently, the images are output in the following order: the left-eye image L5 and the left-eye image L5, which provides the 2D presentation.

As described above, the 3D image processing apparatus according to the present embodiment is capable of smoothly switching the presentation from 3D to 2D by gradually changing the shift amount between the left-eye image and the right-eye image to 0, instead of instantaneously switching the presentation to 2D, when the presentation is switched from 3D to 2D. Thus, it is possible to generate images which bring no feeling of strangeness to viewers.

Sixth Embodiment

The fifth embodiment describes the 3D image processing apparatus which smoothly switches the presentation from 3D to 2D when there is a decoding failure during the 3D presentation. The present embodiment describes the 3D image processing apparatus which smoothly switches the presentation from 3D to 2D based on a user instruction or a preset criterion. The following will not repeat the descriptions overlapping with those in the above embodiments and mainly describes the differences between the above embodiments and the present embodiment.

Figure 19:
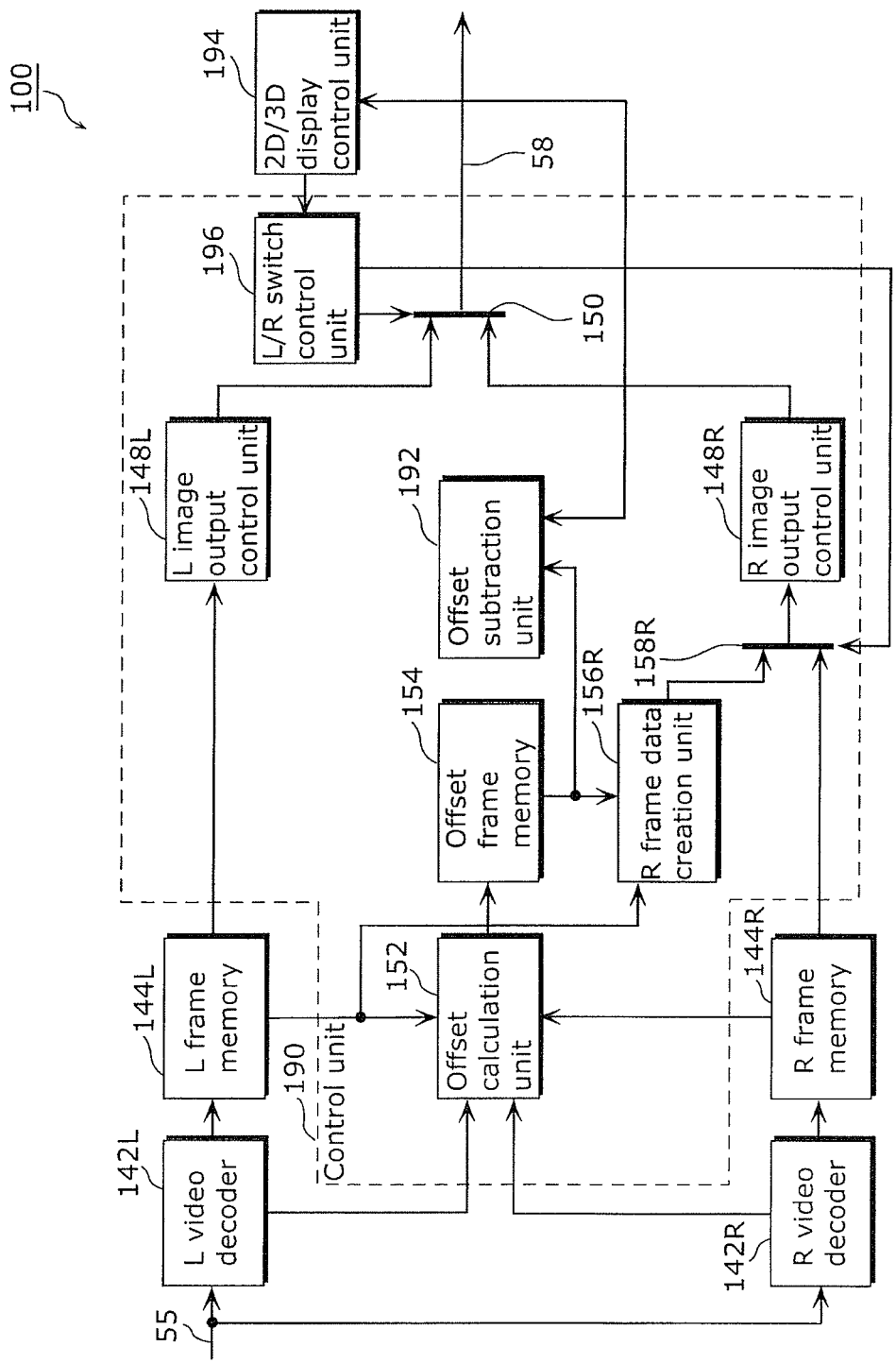
FIG. 19 is a block diagram showing a structure of a 3D image processing apparatus according to the sixth embodiment of the present invention.

FIG. 19 is a block diagram showing a structure of a 3D image processing apparatus according to the sixth embodiment of the present invention.

The 3D image processing apparatus 100 includes the L video decoder 142L, the R video decoder 142R, the L frame memory 144L, the R frame memory 144R, the control unit 190, and a 2D/3D display control unit 194.

The L video decoder 142L, the R video decoder 142R, the L frame memory 144L, and the R frame memory 144R are the same or like as those according to the second embodiment which have been described with reference to FIG. 8. Detailed descriptions on these components will therefore not be repeated.

The 2D/3D display control unit 194 switches the 2D presentation or the 3D presentation. This switching may be performed based on a user instruction or may be performed based on a preset criterion. For example, the presentation may be switched based on a switch signal of the 2D presentation or the 3D presentation included in the broadcast waves 42. When the presentation is switched from 3D to 2D, the 2D/3D display control unit 194 outputs the switch signal to an offset subtraction unit 192.

Next, a detailed structure of the control unit 190 is described.

As shown in FIG. 19, the control unit 190 includes the offset calculation unit 152, the offset frame memory 154, the R frame data creation unit 156R, the selector 158R, the offset subtraction unit 192, the L image output control unit 148L, the R image output control unit 148R, an L/R switch control unit 196, and the selector 150.

Each of the offset calculation unit 152, the offset frame memory 154, the R frame data creation unit 156R, the selector 158R, the L image output control unit 148L, the R image output control unit 148R, and the selector 150 has the same structure as a corresponding one in the 3D image processing apparatus 100 according to the second embodiment shown in FIG. 8.

The offset subtraction unit 192 subtracts a preset positive value n from each of the offsets which is determined for each pixel or every couple of pixels and stored in the offset frame memory 154, in synchronization with the timing of decodes in the L video decoder 142L or the timing of decodes in the R video decoder 142R, when the 2D/3D display control unit 194 switches the presentation from 3D to 2D. When the offset becomes 0 or less as a result of the subtraction, the offset subtraction unit 182 sets the offset to be 0. The offset subtraction unit 192 notifies the 2D/3D display control unit 194 that the offset is 0.

The 2D/3D display control unit 194 notifies the L/R switch control unit 196 that the presentation has been switched to 3D or 2D and that the offset is 0 as a result of calculation by the offset subtraction unit 192.

The L/R switch control unit 196 generates the control signal such that the selector 150 outputs the left-eye images 58L and the right-eye images 58R alternately at 60p, and then outputs the generated control signal to the selector 150, after the presentation is switched to 3D, or for a period after the presentation is switched to 2D until the offset becomes 0. According to the control signal from the L/R switch control unit 196, the selector 150 outputs the left-eye images 58L and the right-eye images 58R alternately at 60p.

Furthermore, the L/R switch control unit 196 generates the control signal such that the selector 150 outputs, at 60p, the left-eye images 58L controlled to output by the L image output control unit 148L, and then outputs the generated control signal to the selector 150, after the presentation is switched to 2D and the offset becomes 0. According to the control signal from the L/R switch control unit 196, the selector 150 outputs the left-eye images 58L at 60p. At this time, in the case where the L video decoder 142L performs the decodes at intervals of 1/30 second only, the selector 150 outputs the same left-eye image 58L twice in series to achieve the output at 60p.

Furthermore, the L/R switch control unit 196 generates the control signal such that the selector 158R outputs the right-eye image 58R stored in the R frame memory 144R, and outputs the generated control signal to the selector 158R, after the presentation is switched to 3D. According to the control signal from the L/R switch control unit 196, the selector 158R outputs the right-eye image 58R stored in the R frame memory 144R.

Furthermore, the L/R switch control unit 196 generates the control signal such that the selector 158R outputs the pseudo right-eye image 58R generated by the R frame data creation unit 156R, and outputs the generated control signal to the selector 158R, after the presentation is switched to 2D. According to the control signal from the L/R switch control unit 196, the selector 158R outputs the pseudo right-eye image 58R generated by the R frame data creation unit 156R.

Time-series processing of the 3D image processing apparatus 100 configured as above is described.

Figure 20:
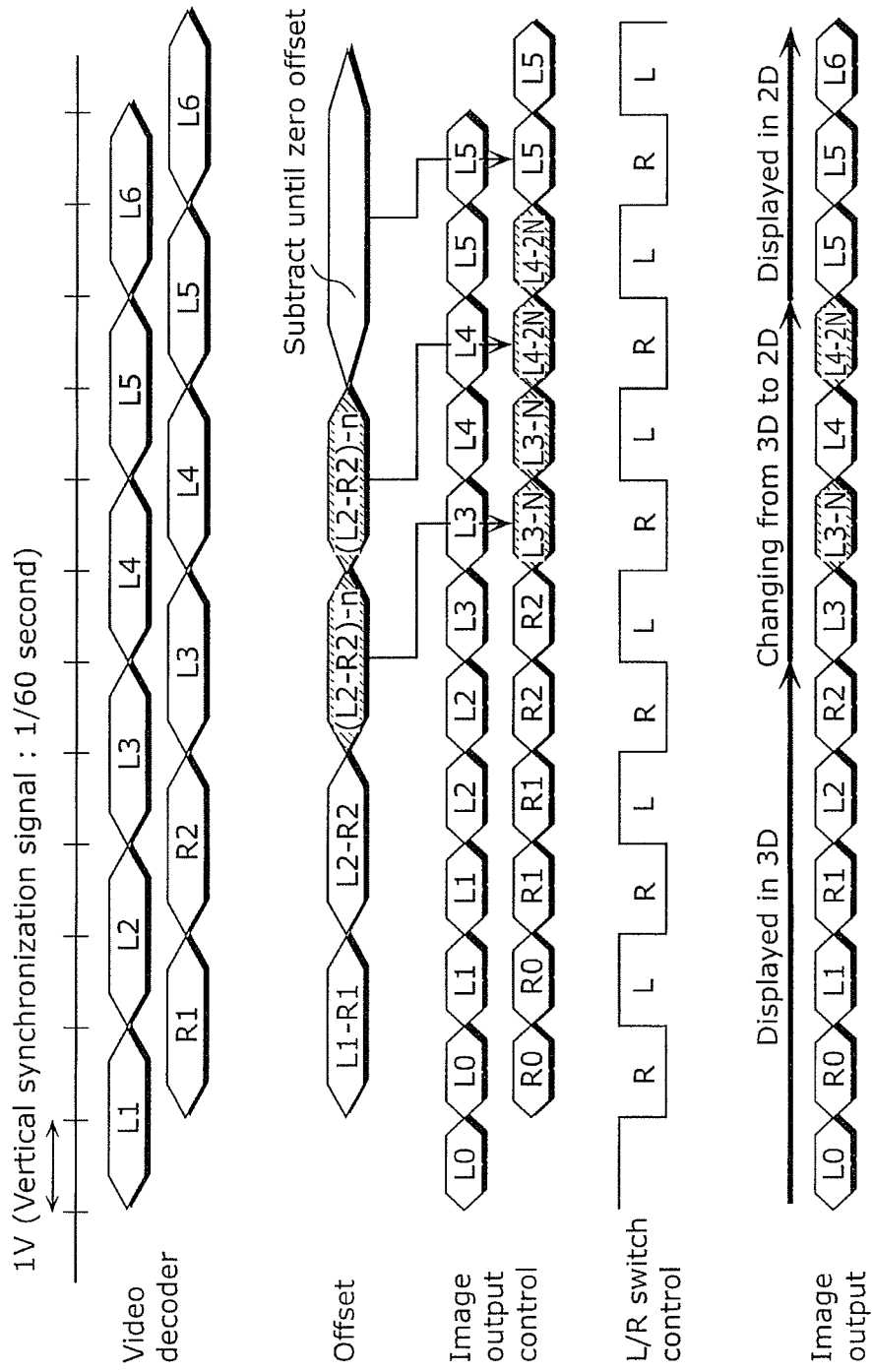
FIG. 20 is a timing chart of a process which the 3D image processing apparatus executes.

FIG. 20 is a timing chart of the process which the 3D image processing apparatus 100 executes. The example of FIG. 20 shows the case where the 2D/3D display control unit 194 switches the presentation from 3D to 2D at the point in time when the decode to generate the right-eye image R2 ends.

The L video decoder 142L performs one decode per 2V period to generate the left-eye image 58L. The respective decoded left-eye images 58L are denoted by L1 to L6.

In the meantime, the R video decoder 142R performs one decode per 2V period to generate the right-eye image 58R, at a point shifted in time by a 1V period from the point at which the L video decoder 142L performs the decode.

At this time, in the offset frame memory 154, an offset (L1–R1) calculated based on the left-eye image L1 and the right-eye image R1 is stored first. The offset is updated every 2V period, and in the next 2V period, an offset (L2–R2) calculated based on the left-eye image L2 and the right-eye image R2 is stored.

Subsequently, since the presentation has been switched from 3D to 2D, the offset subtraction unit 182 subtracts the preset positive value n from the offset (L2–R2) and stores (L2–R2)–n in the offset frame memory 154 in the next 2V period. Furthermore, in the next 2V period, (L2–R2)–2n obtained by the offset subtraction unit 182 subtracting the preset positive value n from the offset (L2–R2)–n is stored in the offset frame memory 154. The offset subtraction unit 182 keeps on subtracting the positive value n from the offset stored in the offset frame memory 154, every 2V period until the offset becomes 0.

The L image output control unit 148L outputs the left-eye images at 60p. It is to be noted that the L video decoder 142L generates the left-eye images at 30p. Thus, the L image output control unit 148L outputs the same image twice in series. For example, the L image output control unit 148L outputs the left-eye image L1 twice in series at intervals of 1/60 second. The L image output control unit 148L then outputs the left-eye image L2 twice in series at intervals of 1/60 second.

The R image output control unit 148R outputs the right-eye images at 60p. It is to be noted that the R image output control unit 148R outputs the same image twice in series for the same reason as the L image output control unit 148L. For example, the R image output control unit 148R outputs the right-eye image R1 twice in series at intervals of 1/60 second. The R image output control unit 148R then outputs the right-eye image R2 twice in series at intervals of 1/60 second.

Subsequently, since the presentation has been switched to 2D, the R image output control unit 148R outputs, twice in series, the pseudo right-eye image (which is referred to as "L3–N" in FIG. 20) generated by the R frame data creation unit 156R. Here, the right-eye image L3–N is an image obtained by shifting the latest left-eye image L3 leftward by the offset (L2–R2)–n stored in the offset frame memory 154. The R image output control unit 148R then outputs, twice in series, the pseudo right-eye image (which is referred to as "L4–2N" in FIG. 8) generated by the R frame data creation unit 156R. Here, the right-eye image L4–2N is an image obtained by shifting the latest left-eye image L4 leftward by the offset (L2–R2)–2n stored in the offset frame memory 154. Since the offset stored in the offset frame memory 154 gradually approaches 0, the shift amount between the left-eye image and the right-eye image ultimately becomes 0, with the result that the R image output control unit 148R outputs the same image as the left-eye image which the L image output control unit 148L outputs. Assume that the offset becomes 0 as a result of further subtraction of the preset positive value n from the offset (L2–R2)–2n. At this time, the R frame data creation unit 156R generates, as the right-eye image, the same image as the left-eye image L5, and the R image output control unit 148R accordingly outputs, as the right-eye image, the same image as the left-eye image L5.

The L/R switch control unit 196 outputs, alternately at intervals of 1/60 second, signals to select the output of the L image output control unit 148L and the R image output control unit 148R. This causes the selector 150 to output the left-eye images and the right-eye images alternately at intervals of 1/60 second. This means that the selector 150 outputs images in the following order: the left-eye image L1, the right-eye image R1, the left-eye image L2, and the right-eye image R2. Subsequently, the images are output in the following order: the left-eye image L3, the right-eye image L3–N, the left-eye image L4, and the right-eye image L4–2N, while the offset in generating the right-eye image gradually approaches 0. This means that the shift amount between the left-eye image and the right-eye image is gradually eliminated so that the presentation can be smoothly transit from 3D to 2D. The L/R switch control unit 196 outputs, at intervals of ⅟₆₀ second, signals to select the output of the L image output control unit 148L. This causes the selector 150 to output the left-eye images at intervals of ⅟₆₀ second. Subsequently, the images are output in the following order: the left-eye image L5, the left-eye image L5, and the left-eye image L6, which provides the 2D presentation.

As described above, the 3D image processing apparatus according to the present embodiment is capable of smoothly switching the presentation from 3D to 2D by gradually changing the shift amount between the left-eye image and the right-eye image to 0, instead of instantaneously switching the presentation to 2D, when the presentation is switched from 3D to 2D. Thus, it is possible to generate images which bring no feeling of strangeness to viewers.

While the above describes the 3D image processing apparatuses 100 according to the embodiments of the present invention, the present invention is not limited to these embodiments.

For example, all the above embodiments assume that the right-eye image and the left-eye image which have a parallax therebetween are presented to display images which convey a stereoscopic perception to viewers. However, the number of image views is not limited to two and may be three or more. That is, the 3D image processing apparatus generates image data in a plurality of views for stereoscopic vision. Furthermore, the 3D image processing apparatus may include: a decoder which decodes stream data generated by coding image data of multiple views, to generate image data of the multiple views; an image output control unit configured to output the image data of the multiple views generated as a result of decoding by a decoder; and a control unit configured to, when, in the decoder, a decoding error occurs in generating image data of a first view included in the multiple views and a successful decode occurs in generating image data of at least one other view which is different from the first view and included in the multiple views, (i) shift, by a preset offset, a pixel position of image data of a second view included in the other view, to generate pseudo image data of the first view, and (ii) output the generated pseudo image data of the first view to the image output control unit, wherein the image output control unit is configured to output the image data of the other view and the generated pseudo image data of the first view, when, in the decoder, the decoding error occurs in generating the image data of the first view and the successful decode occurs in generating the image data of the other view.

Furthermore, each of the various decoders described in all the above embodiments is not an essential constituent of the 3D image processing apparatus and may be provided outside the 3D image processing apparatus.

Furthermore, while the presentation is switched to 2D only when the number of consecutive decoding failures is equal to or more than a given number in the variation of the fourth embodiment, this variation may be applied to the other embodiments. For example, in the first embodiment, the pseudo graphic data may be generated only when the number of consecutive decoding failures is equal to or more than a given number. In the second embodiment, the pseudo image may be generated only when the number of consecutive decoding failures is equal to or more than a given number. In the fifth embodiment, the presentation may be consecutively switched to 2D only when the number of consecutive decoding failures is equal to or more than a given number.

Furthermore, in the fifth embodiment, the value to be subtracted from the offset is set to be a given positive value n. Depending on the magnitude of the offset, its timing of convergence to 0 is different. For example, assume that there are an offset having a value of 100 and an offset having a value of 200 and that the given positive value n is 50, the former converges to 0 by two operations of subtraction while the latter converges to 0 by four operations of subtraction. Thus, it may be possible that the value to be subtracted changes depending on the offset so that all the offsets converge to 0 by the same number of operations. For example, it may be possible that, when the offset is 100, the value to be subtracted is set to be 50 so that the offset converges to 0 by two operations, while, when the offset is 200, the value to be subtracted is set to be 100 so that the offset converges to 0 by two operations.

Furthermore, after the presentation is switched to 2D, while the 3D image processing apparatus according to each of the third to sixth embodiments is configured to output the left-eye image, it may be configured to output the right-eye image.

Furthermore, while the above description illustrates an example where a pair of dedicated glasses (the shutter glasses 43) is used, the present invention is applicable also to a system capable of providing 3D presentation using no dedicated glasses.

Furthermore, while the above description illustrates an example where the 3D image includes the left-eye images and the right-eye images which have different parallaxes, the 3D image may include three or more images which have different parallaxes.

Furthermore, while the 3D image processing apparatus 100 outputs the left-eye image 58L and the right-eye image 58R separately in the above description, the left-eye image 58L and the right-eye image 58R may be synthesized before output.

Furthermore, while the above description illustrates an example where the 3D image processing apparatus 100 according to the implementations of the present invention is applied to a digital television and a digital video recorder, the 3D image processing apparatus 100 according to the implementations of the present invention may be applied to 3D image display devices (such as mobile phone devices and personal computers) other than the digital television, which display 3D images. Furthermore, the 3D image processing apparatus 100 according to the implementations of the present invention is applicable to 3D image output devices (such as BD players) other than the digital video recorder, which output 3D images.

Furthermore, the above 3D image processing apparatus 100 according to the first to fifth embodiments is typically implemented as a large-scale integration (LSI) that is an integrated circuit. Components may be each formed into a single chip, and it is also possible to integrate part or all of the components in a single chip.

This circuit integration is not limited to the LSI and may be achieved by providing a dedicated circuit or using a general-purpose processor. It is also possible to utilize a field programmable gate array (FPGA), with which LSI is programmable after manufacture, or a reconfigurable processor, with which connections, settings, etc., of circuit cells in LSI are reconfigurable.

Furthermore, if any other circuit integration technology to replace LSI emerges thanks to semiconductor technology development or other derivative technology, such technology may, of course, be used to integrate the processing units.

Moreover, the processor such as CPU may execute a program to perform part or all of the functions of the 3D image processing apparatuses 100 and 100B according to the first to fifth embodiments of the present invention.

Furthermore, the present invention may be the above program or a recording medium on which the above program has been recorded. It goes without saying that the above program may be distributed via a communication network such as the Internet.

Furthermore, it may also be possible to combine at least part of functions of the above-described 3D image processing apparatuses 100 and 100B according to the first to fifth embodiments and variations thereof.

All the numerical values herein are given as examples to provide specific explanations of the present invention, and the present invention is thus not restricted by those numerical values.

Furthermore, the present invention encompasses various embodiments that are obtained by making various modifications which those skilled in the art could think of, to the present embodiments, without departing from the spirit or scope of the present invention.

The embodiments disclosed herein shall be considered in all aspects as illustrative and not restrictive. The scope of the present invention is indicated by the appended claims rather than the foregoing description and intended to cover all modifications within the scope of the claims and their equivalents.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is applicable to 3D image processing apparatuses and particularly to digital televisions and digital video recorders.

What is claimed is:

1. A three-dimensional (3D) image processing apparatus which generates image data of multiple views for stereoscopic vision, said 3D image processing apparatus comprising:
an image output control unit which outputs the image data of the multiple views generated as a result of decoding by a decoder;
a control unit which, when, in the decoder, a decoding error occurs in generating image data of a first view included in the multiple views and a successful decode occurs in generating image data of at least one other view which is different from the first view and included in the multiple views, (i) shifts, by a preset offset, a pixel position of image data of a second view included in the at least one other view, to generate pseudo image data of the first view, and (ii) outputs the generated pseudo image data of the first view to said image output control unit; and
a decoder which decodes stream data generated by coding image data of multiple views, to generate the image data of the multiple views,
wherein said image output control unit outputs the image data of the at least one other view and the generated pseudo image data of the first view, when, in the decoder, the decoding error occurs in generating the image data of the first view and the successful decode occurs in generating the image data of the at least one other view,
the image data of the multiple views includes left-eye image data and right-eye image data for stereoscopic vision,
said decoder decodes stream data generated by coding the left-eye image data and the right-eye image data, to generate the left-eye image data and the right-eye image data,
said image output control unit outputs the left-eye image data and the right-image data generated by said decoder,
said control unit, when, in said decoder, a decoding error occurs in generating one of the left-eye image data and the right-eye image data and a successful decode occurs in generating the other of the left-eye image data and the right-eye image data, (i) shifts, by a preset offset, a pixel position of the other of the left-eye image data and the right-eye image data, to generate pseudo image data as the one of the left-eye image data and the right-eye image data, and (ii) outputs, to said image output control unit, the pseudo image data generated as the one of the left-eye image data and the right-eye image data,
and said image output control unit outputs the other of the left-eye image data and the right-eye image data, and the pseudo image data generated as the one of the left-eye image data and the right-eye image data, when, in said decoder, the decoding error occurs in generating the one of the left-eye image data and the right-eye image data and the successful decode occurs in generating the other of the left-eye image data and the right-eye image data, and
said control unit (i) calculates, as the preset offset, a horizontal shift amount between the left-eye image data and the right-eye image data, for every successful decode of said decoder in generating the left-eye image data and the right-eye image data, and (ii) shifts, by the latest preset offset, the pixel position of the other of the left-eye image data and the right-eye image data, to generate pseudo image data as the one of the left-eye image data and the right-eye image data, when, in said decoder, the decoding error occurs in generating the one of the left-eye image data and the right-eye image data and the successful decode occurs in generating the other of the left-eye image data and the right-eye image data.

2. The 3D image processing apparatus according to claim 1,
wherein each of the left-eye image data and the right-eye image data represents a video image, and
said control unit calculates the shift amount as the preset offset by performing, for each pixel or each preset set of pixels, pattern matching between the left-eye image data and the right-eye image data.

3. The 3D image processing apparatus according to claim 1, wherein each of the left-eye image data and the right-eye image data represents a graphic which is displayed over a video image.

4. A three-dimensional (3D) image processing apparatus which generates image data of multiple views for stereoscopic vision, said 3D image processing apparatus comprising:
an image output control unit which outputs the image data of the multiple views generated as a result of decoding by a decoder;
a control unit which, when, in the decoder, a decoding error occurs in generating image data of a first view included in the multiple views and a successful decode occurs in generating image data of at least one other view which is different from the first view and included in the multiple views, (i) shifts, by a preset offset, a pixel position of image data of a second view included in the at least one other view, to generate pseudo image data of the first view, and (ii) outputs the generated pseudo image data of the first view to said image output control unit; and a decoder which decodes stream data generated by coding image data of multiple views, to generate the image data of the multiple views, wherein said image output control unit outputs the image data of the at least one other view and the generated pseudo image data of the first view, when, in the decoder, the decoding error occurs in generating the image data of the first view and the successful decode occurs in generating the image data of the at least one other view, the image data of the multiple views includes left-eye image data and right-eye image data for stereoscopic vision, said decoder decodes stream data generated by coding the left-eye image data and the right-eye image data, to generate the left-eye image data and the right-eye image data, said image output control unit outputs the left-eye image data and the right-image data generated by said decoder, said control unit, when, in said decoder, a decoding error occurs in generating one of the left-eye image data and the right-eye image data and a successful decode occurs in generating the other of the left-eye image data and the right-eye image data, (i) shifts, by a preset offset, a pixel position of the other of the left-eye image data and the right-eye image data to generate pseudo image data as the one of the left-eye image data and the right-eye image data, and (ii) outputs, to said image output control unit, the pseudo image data generated as the one of the left-eye image data and the right-eye image data, and said image output control unit outputs the other of the left-eye image data and the right-eye image data, and the pseudo image data generated as the one of the left-eye image data and the right-eye image data, when, in said decoder, the decoding error occurs in generating the one of the left-eye image data and the right-eye image data and the successful decode occurs in generating the other of the left-eye image data and the right-eye image data, and said control obtains, as the preset offset, an offset included in the stream data decoded by said decoder.

5. A three-dimensional (3D) image processing apparatus which generates image data of multiple views for stereoscopic vision, said 3D image processing apparatus comprising:

an image output control unit which outputs the image data of the multiple views generated as a result of decoding by a decoder;

a control unit which, when, in the decoder, a decoding error occurs in generating image data of a first view included in the multiple views and a successful decode occurs in generating image data of at least one other view which is different from the first view and included in the multiple views, (i) shifts, by a preset offset, a pixel position of image data of a second view included in the at least one other view, to generate pseudo image data of the first view, and (ii) outputs the generated pseudo image data of the first view to said image output control unit; and a decoder which decodes stream data generated by coding image data of multiple views, to generate the image data of the multiple views, wherein said image output control unit outputs the image data of the at least one other view and the generated pseudo image data of the first view, when, in the decoder, the decoding error occurs in generating the image data of the first view and the successful decode occurs in generating the image data of the at least one other view, the image data of the multiple views includes left-eye image data and right-eye image data for stereoscopic vision, said decoder decodes stream data generated by coding the left-eye image data and the right-eye image data, to generate the left-eye image data and the right-eye image data, said image output control unit outputs the left-eye image data and the right-image data generated by said decoder, said control unit, when, in said decoder, a decoding error occurs in generating one of the left-eye image data and the right-eye image data and a successful decode occurs in generating the other of the left-eye image data and the right-eye image data, (i) shifts, by a preset offset, a pixel position of the other of the left-eye image data and the right-eye image data, to generate pseudo image data as the one of the left-eye image data and the right-eye image data, and (ii) outputs, to said image output control unit, the pseudo image data generated as the one of the left-eye image data and the right-eye image data, and said image output control unit outputs the other of the left-eye image data and the right-eye image data, and the pseudo image data generated as the one of the left-eye image data and the right-eye image data, when, in said decoder, the decoding error occurs in generating the one of the left-eye image data and the right-eye image data and the successful decode occurs in generating the other of the left-eye image data and the right-eye image data, and said control unit outputs, to said image output control unit, the pseudo image data generated as the one of the left-eye image data and the right-eye image data, only when, in said decoder, decoding errors occur for a predetermined number of consecutive frames in generating the one of the left-eye image data and the right-eye image data.

6. A three-dimensional (3D) image processing apparatus which generates left-eye image data and right-eye image data for stereoscopic vision, said 3D image processing apparatus comprising:

a decoder which decodes stream data generated by coding left-eye image data and right-eye image data, to generate the left-eye image data and the right-eye image data; and a control unit which, when, in said decoder, a successful decode occurs in generating both the left-eye image data and the right-eye image data, (i) outputs the left-eye image data and the right-eye image data at preset time intervals, and when, in said decoder, a decoding error occurs in generating one of the left-eye image data and the right-eye image data and a successful decode occurs in generating the other of the left-eye image data and the right-eye image data, (ii) outputs only the other of the left-eye image data and the right-eye image data at preset time intervals, wherein said control unit includes:

an offset calculation unit which calculates, as an offset, a horizontal shift amount between the left-eye image data and the right-eye image data, for every successful decode of said decoder in generating each of the left-eye image data and the right-eye image data; and an offset update unit which updates the offset by gradually decreasing the latest offset calculated by said offset calculation unit until the offset ultimately becomes 0, when, in said decoder, the decoding error occurs in generating the one of the left-eye image data and the right-eye image data and the successful decode occurs in generating the other of the left-eye image data and the right-eye image data, and said control unit, when, in said decoder, the decoding error occurs in generating the one of the left-eye image data and the right-eye image data and the successful decode occurs in generating the other of the left-eye image data and the right-eye image data, (i) shifts, based on the offset updated by said offset update unit, a pixel position of the other of the left-eye image data and the right-eye image data, to generate pseudo image data as the one of the left-eye image data and the right-eye image data, (ii) outputs, at the preset time intervals, the other of the left-eye image data and the right-eye image data, and the pseudo image data generated as the one of the left-eye image data and the right-eye image data, until the offset is updated to 0, and (iii) outputs, at the preset time intervals, only the other of the left-eye image data and the right-eye image data after the offset is updated to 0.

7. The 3D image processing apparatus according to claim 6, wherein, only when, in said decoder, decoding errors occur for a predetermined number of consecutive frames in generating one of the left-eye image data and the right-eye image data, said control unit outputs, at the preset time intervals, only the other of the left-eye image data and the right-eye image data which is generated as a result of the successful decode.

8. The 3D image processing apparatus according to claim 6, wherein, when the number of consecutive decoding errors by said decoder in generating one of the left-eye image data and the right-eye image data is less than the predetermined number of consecutive frames, said control unit outputs only the one of the left-eye image data and the right-eye image data which is generated as a result of a successful decode.

9. A three-dimensional (3D) image processing apparatus which generates left-eye image data and right-eye image data for stereoscopic vision, said 3D image processing apparatus comprising:

a decoder which decodes stream data generated by coding left-eye image data and right-eye image data, to generate the left-eye image data and the right-eye image data;

a 2D/3D display control unit which issues an instruction to switch to two-dimensional (2D) presentation or 3D presentation; and a control unit which, when said 2D/3D display control unit issues the instruction to switch to the 3D presentation, (i) outputs the left-eye image data and the right-eye image data at preset time intervals, and when said 2D/3D display control unit issues the instruction to switch to the 2D presentation, (ii) outputs at the preset time intervals, only one of the left-eye image data and the right-eye image data, wherein said control unit includes:

an offset calculation unit which calculates, as an offset, a horizontal shift amount between the left-eye image data and the right-eye image data, for every successful decode of said decoder in generating each of the left-eye image data and the right-eye image data; and an offset update unit which updates the offset by gradually decreasing the latest offset calculated by said offset calculation unit until the offset ultimately becomes 0, when said 2D/3D display control unit issues the instruction to switch from the 3D presentation to the 2D presentation, wherein said control unit, when said 2D/3D display control unit issues the instruction from the 3D presentation to the 2D presentation, (i) shifts, based on the offset updated by said offset update unit, a pixel position of the one of the left-eye image data and the right-eye image data, to generate pseudo image data as the other of the left-eye image data and the right-eye image data, (ii) outputs, at the preset time intervals, the one of the left-eye image data and the right-eye image data, and the pseudo image data generated as the other of the left-eye image data and the right-eye image data, until the offset is updated to 0, and (iii) outputs, at the preset time intervals, only the one of the left-eye image data and the right-eye image data after the offset is updated to 0.

* * * * *